(12) United States Patent
Hirokawa

(10) Patent No.: US 11,343,390 B2
(45) Date of Patent: May 24, 2022

(54) INFORMATION PROCESSING APPARATUS, INFORMATION PROCESSING METHOD, AND RECORDING MEDIUM

(71) Applicant: Tatsuma Hirokawa, Kanagawa (JP)

(72) Inventor: Tatsuma Hirokawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/921,089

(22) Filed: Jul. 6, 2020

(65) Prior Publication Data
US 2021/0029257 A1 Jan. 28, 2021

(30) Foreign Application Priority Data

Jul. 24, 2019 (JP) .............................. JP2019-136370

(51) Int. Cl.
*H04N 1/00* (2006.01)

(52) U.S. Cl.
CPC ..... *H04N 1/00411* (2013.01); *H04N 1/00477* (2013.01); *H04N 1/00941* (2013.01); *H04N 1/00962* (2013.01)

(58) Field of Classification Search
CPC .......... H04N 1/00411; H04N 1/00477; H04N 1/00941; H04N 1/00962; H04N 1/444; H04N 1/00244; H04N 1/448; H04N 1/32144

USPC ......................................................... 358/442
See application file for complete search history.

(56) References Cited

U.S. PATENT DOCUMENTS

| | | | |
|---|---|---|---|
| 2014/0089821 A1* | 3/2014 | Rios, III ............... | G06F 3/1423 715/761 |
| 2014/0351817 A1* | 11/2014 | Sawamura ......... | H04N 1/00244 718/102 |
| 2017/0359722 A1* | 12/2017 | Folse .................... | H04L 63/083 |
| 2018/0068345 A1* | 3/2018 | Hirokawa .......... | H04N 1/00941 |
| 2019/0012402 A1 | 1/2019 | Hitomi et al. | |

FOREIGN PATENT DOCUMENTS

| | | |
|---|---|---|
| JP | 2014-229094 | 12/2014 |
| JP | 2017-144649 | 8/2017 |

* cited by examiner

*Primary Examiner* — Darryl V Dottin
(74) *Attorney, Agent, or Firm* — IPUSA, PLLC

(57) ABSTRACT

An information processing apparatus includes: a memory that stores control information to be utilized for displaying a setting screen on which entry of a setting value for an application added to the information processing apparatus is received; and circuitry to receive a user operation related to execution of the application on the setting screen and perform processing for installing the application.

20 Claims, 34 Drawing Sheets

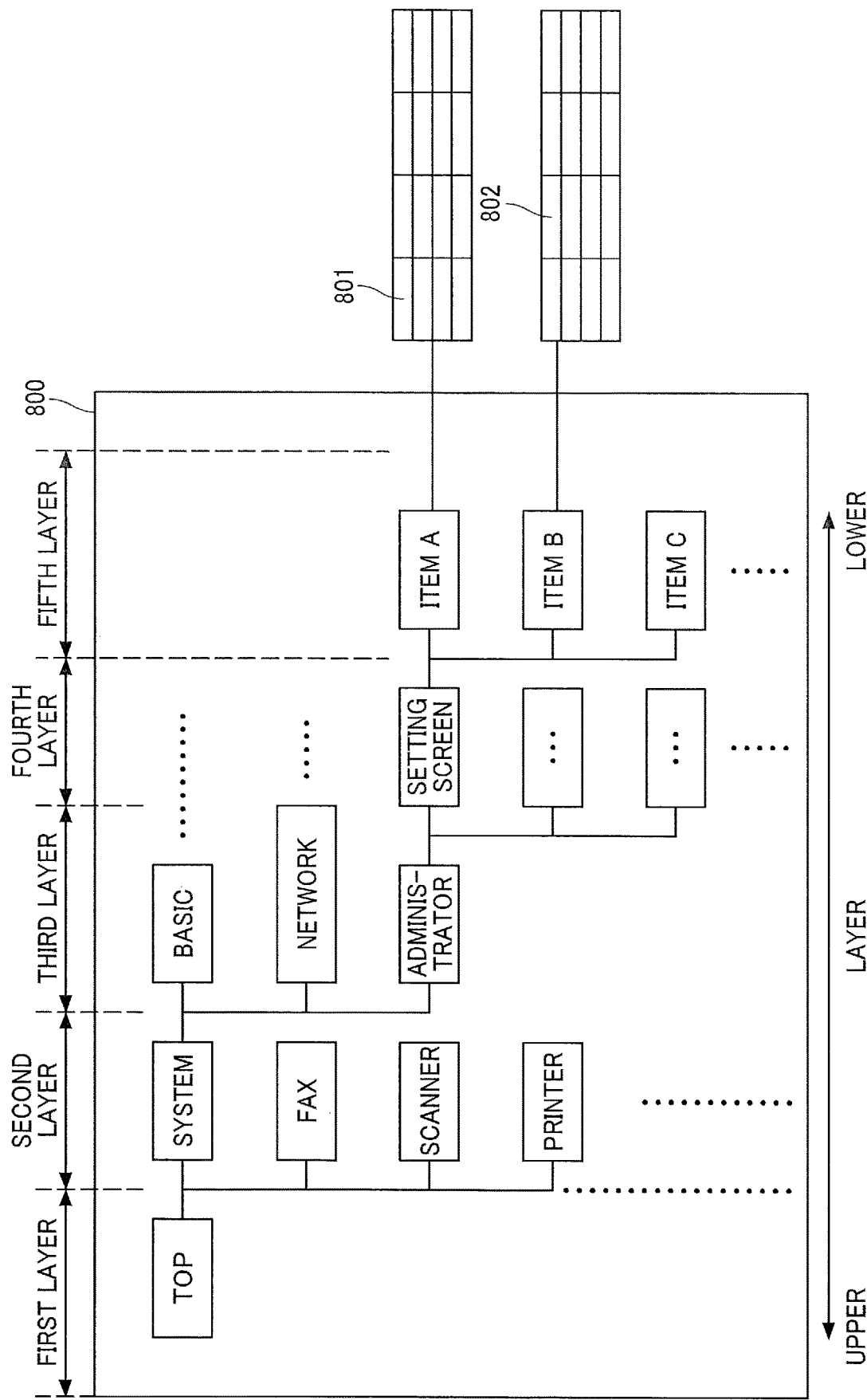

FIG. 10 id: xxxxx
title: ADMINISTRATOR
type: category
children: [
　　{SETTING SCREEN},
　　{…}]

FIG. 11 id: yyyyy
title: SETTING SCREEN
type: window
children: [id of ITEM A,
　　　　　id of ITEM B,
　　　　　id of ITEM C]

FIG. 13

```
{
  "requestId":"1",
  "item":{
    "method":"GET",
    "lang":"ja",
    "items":[                    ~1601
      {"id":"0000000300000065"}
    ]
  }
}
```

FIG. 14

```
POST /xxxxxx/settings
Content-Type: application/json
Content-Length: xxxx

{
  "requestId":"1",
  "item": {
    "method": "GET",
    "lang": "ja",
    "items": [
      {
        "id": "0000000300000065",
        "title": "PORT NUMBER",    ~1701
        "value": ["25"]
        ......
      }
    ]
  }
}
```

1804

EXECUTE BACKUP OF ADDRESS BOOK

THE ADDRESS BOOK OF THE DEVICE IS BEING BACKED UP.

---------------- 0%

18043

CANCEL

1804

EXECUTE BACKUP OF ADDRESS BOOK

THE ADDRESS BOOK OF THE DEVICE IS BEING BACKED UP.

---------- 50%

18043

CANCEL

EXECUTE BACKUP OF ADDRESS BOOK

BACKUP OF THE ADDRESS BOOK
OF THE DEVICE HAS BEEN CANCELLED.

CONFIRM

EXECUTE BACKUP OF ADDRESS BOOK

BACKUP OF THE ADDRESS BOOK
OF THE DEVICE HAS BEEN COMPLETED.

100%

CONFIRM

FIG. 31

| SETTING OWNER | ID | SETTING TYPE | RANGE OF ENTRY | TITLE | SETTING VALUE | ARRANGEMENT LOCATION |
|---|---|---|---|---|---|---|
| FIRST APPLICATION | A001 | NUMERICAL VALUE | 0 – 10 | NUMBER OF RETRIES | 3 | OTHER SETTINGS > SETTING OF FIRST APPLICATION |
| FIRST APPLICATION | A002 | NUMERICAL VALUE | 10 – 1000 | INTERVAL OF RETRIES | 100 | OTHER SETTINGS > SETTING OF FIRST APPLICATION |
| SECOND APPLICATION | B001 | CHARACTER STRING | 0 – 100 CHARACTERS | NOTIFICATION FROM ADMINISTRATOR | "THE DEVICE IS UNAVAILABLE FOR USE ON EVERY SUNDAY" | SYSTEM SETTING > ADMINISTRATOR SETTING |
| FIFTH APPLICATION | D001 | OPTION SELECTION | OFF, ON | PERIODICAL BACKUP OF ADDRESS BOOK | ON | OTHER SETTINGS > SETTING OF FIFTH APPLICATION |
| FIFTH APPLICATION | D002 | CLOCK | 00:00 – 23:59 | IMPLEMENTATION TIME OF PERIODICAL BACKUP | 03:00 | OTHER SETTINGS > SETTING OF FIFTH APPLICATION |
| FIFTH APPLICATION | D003 | EXECUTION | EXECUTION I/F: address.backup.EXEC, CANCELLATION I/F: address.backup.CANCEL, EXECUTION CONFIRMATION SCREEN: WILL YOU BACK UP THE ADDRESS BOOK OF THE DEVICE RIGHT NOW? | EXECUTE BACKUP OF ADDRESS BOOK | – | OTHER SETTINGS > SETTING OF FIFTH APPLICATION |
| FIFTH APPLICATION | D004 | EXECUTION | EXECUTION I/F: address.restore.EXEC, CANCELLATION I/F: address.restore.CANCEL, EXECUTION CONFIRMATION SCREEN: WILL YOU RESTORE THE BACKUP DATA OF THE UP-TO-DATE ADDRESS BOOK TO THE DEVICE? | EXECUTE RESTORATION OF ADDRESS BOOK | – | OTHER SETTINGS > SETTING OF FIFTH APPLICATION |
| ... | | | | | | |

FIG. 32

```
{
    "id":"settings",
    "title":"SETTINGS",
    "type":"category",
    "children":[
        {
            "id":"settings:system",
            "title":"SYSTEM SETTING",
            "type":"category",
            "children":[
                {
                    "id":"settings:system:eco",
                    "title":"ECO SETTING",
                    "type":"category",
                    "children":[
                    ]
                },
                {
                    "id":"settings:system:admin",
                    "title":"ADMINISTRATOR SETTING",
                    "type":"category",
                    "children":[
                        {"id":"settings:system:eco:B001"}
                    ]
                }
            ]
        },
        {
            "id":"settings:copy",
            "title":"COPY SETTING",
            "type":"category",
            "children":[
            ]
        },
        {
            "id":"settings:scan",
            "title":"SCANNER SETTING",
            "type":"category",
            "children":[
            ]
        },
        {
            "id":"settings:other",
            "title":"OTHER SETTINGS",
            "type":"category",
            "children":[
                {
                    "id":"settings:other:app1",
                    "title":"SETTING OF FIRST APPLICATION",
                    "type":"category",
                    "children":[
                    ]
                },
                {
                    "id":"settings:other:app5",
                    "title":"SETTING OF FIFTH APPLICATION",
                    "type":"category",
                    "children":[
                        {"id":"settings:other:app5:D001"},
                        {"id":"settings:other:app5:D002"},
                        {"id":"settings:other:app5:D003"},
                        {"id":"settings:other:app5:D004"}
                    ]
                }
            ]
        }
    ]
}
```

| SETTING OWNER | ID | SETTING TYPE | RANGE OF ENTRY (IMPLEMENTATION EXAMPLE) | RANGE OF ENTRY (IMPLEMENTED DATA) |
|---|---|---|---|---|
| FIRST APPLICATION | A001 | NUMERICAL VALUE | 0 – 10 | "{<br>"min":"0",<br>"max":"10"<br>}" |
| FIRST APPLICATION | A002 | NUMERICAL VALUE | 10 – 1000 | "{<br>"min":"10",<br>"max":"1000"<br>}" |
| SECOND APPLICATION | B001 | CHARACTER STRING | 0 – 100 CHARACTERS | "{<br>"minLength":"0",<br>"maxLength:"100"<br>}" |
| ... | | | | |
| FIFTH APPLICATION | D001 | OPTION SELECTION | OFF, ON | "{<br>"list":[<br>{"label":"OFF"},<br>{"label":"ON"}<br>]<br>}" |
| FIFTH APPLICATION | D002 | CLOCK | 00:00 – 23:59 | "{<br>"format":"hm",<br>"ampm":false<br>}" |
| FIFTH APPLICATION | D003 | EXECUTION | EXECUTION I/F: address.backup.EXEC, CANCELLATION I/F: address.backup.CANCEL, EXECUTION CONFIRMATION SCREEN: WILL YOU BACK UP THE ADDRESS BOOK OF THE DEVICE RIGHT NOW? | "{<br>"exec":"address.backup.EXEC",<br>"cancel":"address.backup.CANCEL",<br>"guidance":"WILL YOU BACK UP THE ADDRESS BOOK OF THE DEVICE RIGHT NOW?"<br>}" |
| FIFTH APPLICATION | D004 | EXECUTION | EXECUTION I/F: address.restore.EXEC, CANCELLATION I/F: address.restore.CANCEL, EXECUTION CONFIRMATION SCREEN: WILL YOU RESTORE THE BACKUP DATA OF THE UP-TO-DATE ADDRESS BOOK TO THE DEVICE? | "{<br>"exec":"address.restore.EXEC",<br>"cancel":"address.restore.CANCEL",<br>"guidance":"WILL YOU RESTORE THE BACKUP DATA OF THE UP-TO-DATE ADDRESS BOOK TO THE DEVICE?"<br>}" |
| ... | | | | |

FIG. 34

| SETTING OWNER | ID | SETTING TYPE | RANGE OF ENTRY | TITLE | SETTING VALUE | ARRANGEMENT LOCATION |
|---|---|---|---|---|---|---|
| | | | | ⋮ | | |
| FIRST APPLICATION | A001 | NUMERICAL VALUE | 0 – 10 | NUMBER OF RETRIES | 3 | OTHER SETTINGS 〉 SETTING OF FIRST APPLICATION |
| FIRST APPLICATION | A002 | NUMERICAL VALUE | 10 – 1000 | INTERVAL OF RETRIES | 100 | OTHER SETTINGS 〉 SETTING OF FIRST APPLICATION |
| SECOND APPLICATION | B001 | CHARACTER STRING | 0 – 100 CHARACTERS | NOTIFICATION FROM ADMINISTRATOR | "THE DEVICE IS UNAVAILABLE FOR USE ON EVERY SUNDAY" | SYSTEM SETTING 〉 ADMINISTRATOR SETTING |
| SIXTH APPLICATION | E001 | CHARACTER STRING | 0 – 8 CHARACTERS | SERIAL NUMBER | 00000000 | OTHER SETTINGS 〉 SETTING OF SIXTH APPLICATION |
| SIXTH APPLICATION | E002 | CHARACTER STRING | 0 – 12 CHARACTERS | SYSTEM VERSION | v.1.00–00 | OTHER SETTINGS 〉 SETTING OF SIXTH APPLICATION |
| SIXTH APPLICATION | E003 | EXECUTION | EXECUTION I/F: machine.info.EXEC, EXECUTION CONFIRMATION SCREEN: DEVICE INFORMATION WILL BE SAVED IN EXTERNAL DEVICE. | SAVE DEVICE INFORMATION IN EXTERNAL DEVICE | – | OTHER SETTINGS 〉 SETTING OF SIXTH APPLICATION |
| ⋮ | | | | | | |

FIG. 38

| SETTING OWNER | ID | SETTING TYPE | RANGE OF ENTRY | TITLE | SETTING VALUE | ARRANGEMENT LOCATION | ... |
|---|---|---|---|---|---|---|---|
| FIRST APPLICATION | A001 | NUMERICAL VALUE | 0 – 10 | NUMBER OF RETRIES | 3 | OTHER SETTINGS > SETTING OF FIRST APPLICATION | |
| FIRST APPLICATION | A002 | NUMERICAL VALUE | 10 – 1000 | INTERVAL OF RETRIES | 100 | OTHER SETTINGS > SETTING OF FIRST APPLICATION | |
| SECOND APPLICATION | B001 | CHARACTER STRING | 0 – 100 CHARACTERS | NOTIFICATION FROM ADMINISTRATOR | "THE DEVICE IS UNAVAILABLE FOR USE ON EVERY SUNDAY" | SYSTEM SETTING > ADMINISTRATOR SETTING | |
| ... | | | | | | | |
| SEVENTH APPLICATION | F001 | OPTION SELECTION | OFF, ON | AUDIO NARRATION FUNCTION | OFF | OTHER SETTINGS > SETTING OF SEVENTH APPLICATION | |
| SEVENTH APPLICATION | F002 | OPTION SELECTION | SLOW, STANDARD, FAST | AUDIO NARRATION SPEED | STANDARD | OTHER SETTINGS > SETTING OF SEVENTH APPLICATION | |
| SEVENTH APPLICATION | F003 | EXECUTION — E4 | EXECUTION I/F: talkback.sample.EXEC — C41 | PLAY AUDIO NARRATION SAMPLE | – | OTHER SETTINGS > SETTING OF SEVENTH APPLICATION | |
| ... | | | | | | | |

| SETTING OWNER | ID | SETTING TYPE | RANGE OF ENTRY (IMPLEMENTATION EXAMPLE) | RANGE OF ENTRY (IMPLEMENTED DATA) |
|---|---|---|---|---|
| FIRST APPLICATION | A001 | NUMERICAL VALUE | 0 - 10 | "{<br>"min":"0",<br>"max":"10"<br>}" |
| FIRST APPLICATION | A002 | NUMERICAL VALUE | 10 - 1000 | "{<br>"min":"10",<br>"max":"1000"<br>}" |
| SECOND APPLICATION | B001 | CHARACTER STRING | 0 - 100 CHARACTERS | "{<br>"minLength":"0",<br>"maxLength":"256"<br>}" |
| ... | | | | |
| SEVENTH APPLICATION | F001 | OPTION SELECTION | OFF, ON | "{<br>"list":[<br>{"label":"OFF"},<br>{"label":"ON"}<br>]<br>}" |
| SEVENTH APPLICATION | F002 | OPTION SELECTION | SLOW, STANDARD, FAST | "{<br>"list":[<br>{"label":"SLOW"},<br>{"label":"STANDARD"},<br>{"label":"FAST"}<br>]<br>}" |
| SEVENTH APPLICATION | F003 | EXECUTION | EXECUTION I/F: talkback.sample.EXEC | "{<br>"exec":"talkback.sample.EXEC"<br>}" |
| ... | | | | |

C7

INFORMATION PROCESSING APPARATUS, INFORMATION PROCESSING METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2019-136370, filed on Jul. 24, 2019, in the Japan Patent Office, the entire disclosure of which is hereby incorporated by reference herein.

BACKGROUND

Technical Field

The present invention relates to an information processing apparatus, an information processing method, and a recording medium.

Description of the Related Art

It is possible to additionally install an application to an information processing apparatus such as an image forming apparatus.

Furthermore, there is a case where such a newly added application uses new setting values. In such a case, information of the name indicating a setting item of a setting value to be used for executing an additional function and information related to a setting value entered as a setting item are obtained from a plug-in program by the information processing apparatus, so that a screen for selecting a setting item and a screen for entering a setting value are configured. Even in a case where an application program, etc., that uses new setting values is newly added by installation, the system program for providing the setting function need not change or modify the settings.

However, in the conventional methods, it has not been possible for the user to provide an operation (hereinafter referred to as the "user operation") for an instruction for execution of an application on a setting screen.

SUMMARY

Example embodiments include an information processing apparatus including: a memory that stores control information to be utilized for displaying a setting screen on which entry of a setting value for an application added to the information processing apparatus is received; and circuitry to receive a user operation related to execution of the application on the setting screen and perform processing for installing the application.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 8 is a diagram illustrating an example of a menu structure;

FIG. 10 is a diagram illustrating an example of a code for generating a third layer screen;

FIG. 11 is a diagram illustrating an example of a code for generating a fourth layer screen;

FIG. 13 is an example of a source code for making an inquiry for a setting value;

FIG. 14 is an example of a source code for making a response to an inquiry for a setting value;

FIG. 26 is a diagram illustrating an example of a setting screen in a case where processing is canceled during execution;

FIG. 27 is a diagram illustrating an example of a setting screen in a case where execution is completed without cancellation;

FIG. 31 is a diagram illustrating an example of a storage unit;

FIG. 32 is a diagram illustrating an example of entries in JSON format;

FIG. 33 is a diagram illustrating an example of entries to the storage unit in JSON format;

FIG. 34 is a diagram illustrating an example of the storage unit;

FIG. 38 is a diagram illustrating an example of the storage unit;

FIG. 39 is a diagram illustrating an example of entries to the storage unit in JSON format;

Figure 1:
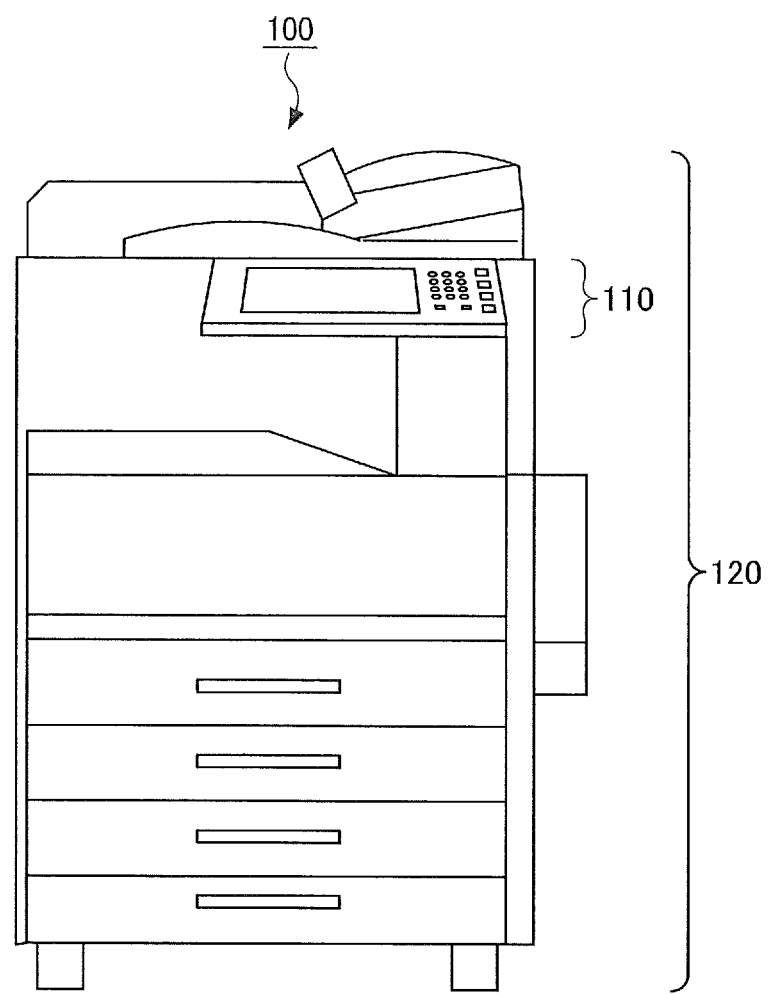
FIG. 1 is a schematic diagram illustrating an example of the general arrangement of an image forming apparatus.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments for carrying out the invention will be explained with reference to the drawings.

First Embodiment

<Example of an Image Forming Apparatus>

FIG. 1 is a schematic diagram illustrating an example of the general arrangement of an image forming apparatus. As illustrated in FIG. 1, the image forming apparatus 100 is, for example, an MFP (Multifunction Peripheral) or the like. Therefore, for example, the image forming apparatus 100 has image processing functions such as a copy function, a scanner function, a facsimile function, and a printer function. Note that the image forming apparatus 100 may further have other functions (for example, an error display function, etc.).

In the present example, the image forming apparatus 100 is configured to have the operation device 110. In addition, the image forming apparatus 100 is configured to have a configuration other than the operation device 110 (hereinafter referred to as the "main device 120").

The user inputs various operations for the image forming apparatus 100 to the operation device 110. Furthermore, by use of the operation device 110 and the main device 120, the image forming apparatus 100 executes image processing based on an operation.

<Example of the Hardware Configuration>

Figure 2:
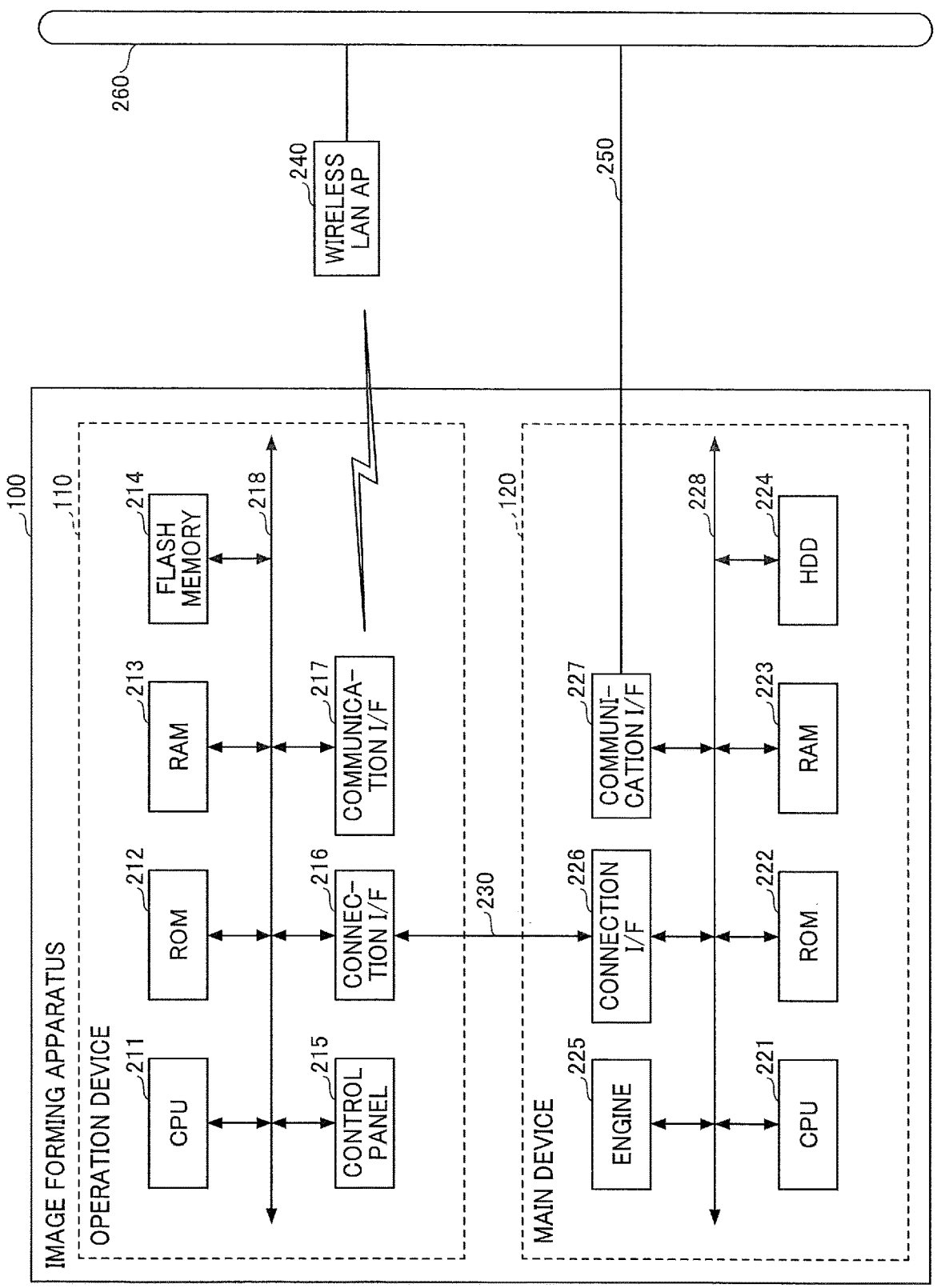
FIG. 2 is a block diagram illustrating an example of the hardware configuration of an operation device and a main device.

FIG. 2 is a block diagram illustrating an example of the hardware configuration of the operation device and the main device. The operation device 110 includes a central processing unit (CPU/hereinafter referred to as the "CPU 211"), a read only memory (ROM/hereinafter referred to as the "ROM 212"), a random access memory (RAM/hereinafter referred to as the "RAM 213"), a flash memory 214, a control panel 215, a connection interface (hereinafter referred to as the "connection I/F 216"), and a communication interface (hereinafter referred to as the "communication I/F 217"). Furthermore, as illustrated in FIG. 2, these hardware resources are mutually connected by a bus 218.

The CPU 211 is an example of an arithmetic device and a control device. Furthermore, the CPU 211 executes various programs stored in the ROM 212 or the flash memory 214, etc., using a main storage device such as the RAM 213 as a work area. By such control and operation, the CPU 211 controls the operation device 110, etc., and implements various kinds of functions.

The flash memory 214 is an example of a non-volatile recording medium. For example, the flash memory 214 stores programs, data, and the like.

The control panel 215 is an example of an input device and an output device. That is, the control panel 215 displays an operation screen, a processing result, and the like. Moreover, the control panel 215 receives an operation from the user.

The connection I/F 216 is an interface that communicates with the main device 120 via the communication path 230. For example, the connection I/F 216 is a connector, a cable, or the like. Specifically, the connection I/F 216 performs communication via universal serial bus (USB), or the like.

The communication I/F 217 is an interface that communicates with an external device via the network 260. For example, the communication I/F 217 is an antenna, etc. In the example illustrated in FIG. 2, the communication I/F 217 is connected to a wireless local area network (LAN) access point (AP (hereinafter referred to as the "wireless LANAP 240") for communication.

The main device 120 includes, for example, a CPU 221, a ROM 222, a RAM 223, an HDD (Hard Disk Drive/ hereinafter referred to as the "HDD 224"), an engine 225, a connection I/F 226, and a communication I/F 227. Furthermore, as illustrated in FIG. 2, the hardware resources are mutually connected by a bus 228.

The CPU 221 is an example of an arithmetic device and a control device. As illustrated in FIG. 2, it is desirable that the arithmetic device and the control device for the main device 120 are separate from the CPU 211 for the operation device 110.

The ROM 222 and the RAM 223 are examples of a storage device for the main device 120, as with the CPU 221. Therefore, the CPU 221 utilizes a main storage device such as the RAM 223 to execute processing based on a program, etc., stored in an auxiliary storage device such as the ROM 222 and the HDD 224.

The engine 225 is a processing device, or the like, for implementing image processing functions such as a copy function, a scanner function, a facsimile function, and a printer function. Specifically, the engine 225 is, for example, a processing IC (Integrated Circuit) or the like. That is, the engine 225 includes a scanner for scanning and reading a document, a plotter for performing printing on a sheet material such as printing paper, a communication unit for performing facsimile communication, or a combination thereof. Note that the engine 225 may include a device for sorting printed sheet materials, or what is termed as a finisher, an automatic document feeder (ADF) for automatically feeding documents, or the like.

The connection I/F 226 is an interface that communicates with the operation device 110 via the communication path 230. For example, the connection I/F 216 is a connector, a cable, or the like. Specifically, the connection I/F 226 performs communication via USB, etc.

The communication I/F 227 is an interface that communicates with an external device via the network 260. For example, the communication I/F 227 includes a cable 250 or the like.

<Example of an Operation Device>

Figure 3:
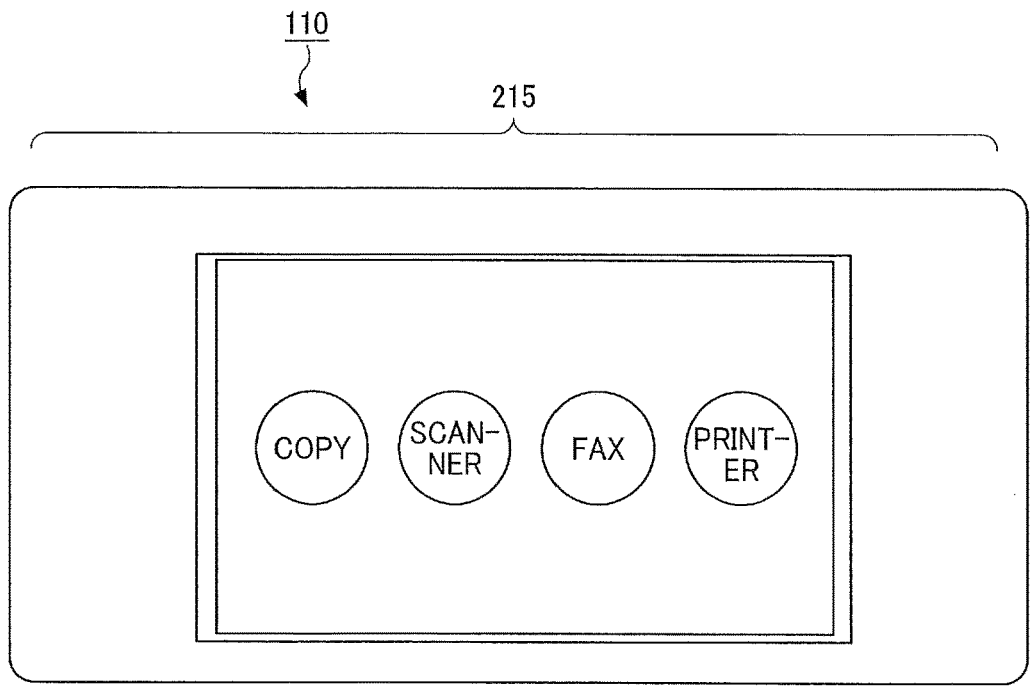
FIG. 3 is a schematic diagram illustrating an example of the external appearance of the operation device.

FIG. 3 is a schematic diagram illustrating an example of the external appearance of the operation device 110. For example, the operation device 110 is a device having such an external appearance as illustrated in FIG. 3. Specifically, the operation device 110 utilizes the control panel 215, etc., to display an operation screen for various functions provided by the image forming apparatus, for example. In the present example, the operation screen receives operations for the "COPY", "SCANNER", "FAX" and "PRINTER" functions. In addition, the example illustrated in FIG. 3 is what is termed as a top screen, on which, in a case where the "COPY" button is pressed, an operation screen for providing detailed settings for the "COPY" function will be displayed, for example.

Furthermore, for example, a setting value to be set or a screen to be displayed after transition in response to pressing of a button on an operation screen is set based on a menu structure, etc.

Note that the operation device 110 need not be implemented by the control panel 215 illustrated in FIG. 3. For example, the control panel 215 may include a hard key, etc., in addition to a touchscreen. That is, the configuration of the interface for operating operation screens may be different from the configuration illustrated in FIG. 3.

Furthermore, as will be illustrated in a drawing, an operation screen may include a help button. Hereinafter, an explanation is given of an example in which, in a case where a help button is pressed, preset help contents will be displayed on the screen. In this way, by an operation of pressing a help button, the user can refer to what is termed as help, a manual, and the like. Note that the method of referring to help contents may be a method other than the operation of pressing a help button. In addition, as for a file for providing such help contents to be referred to, the file may be stored by the operation device 110 or the main device 120 or may be referred to online via a network.

<Example of the Software Configurations of the Operation Device and the Main Device>

Figure 4:
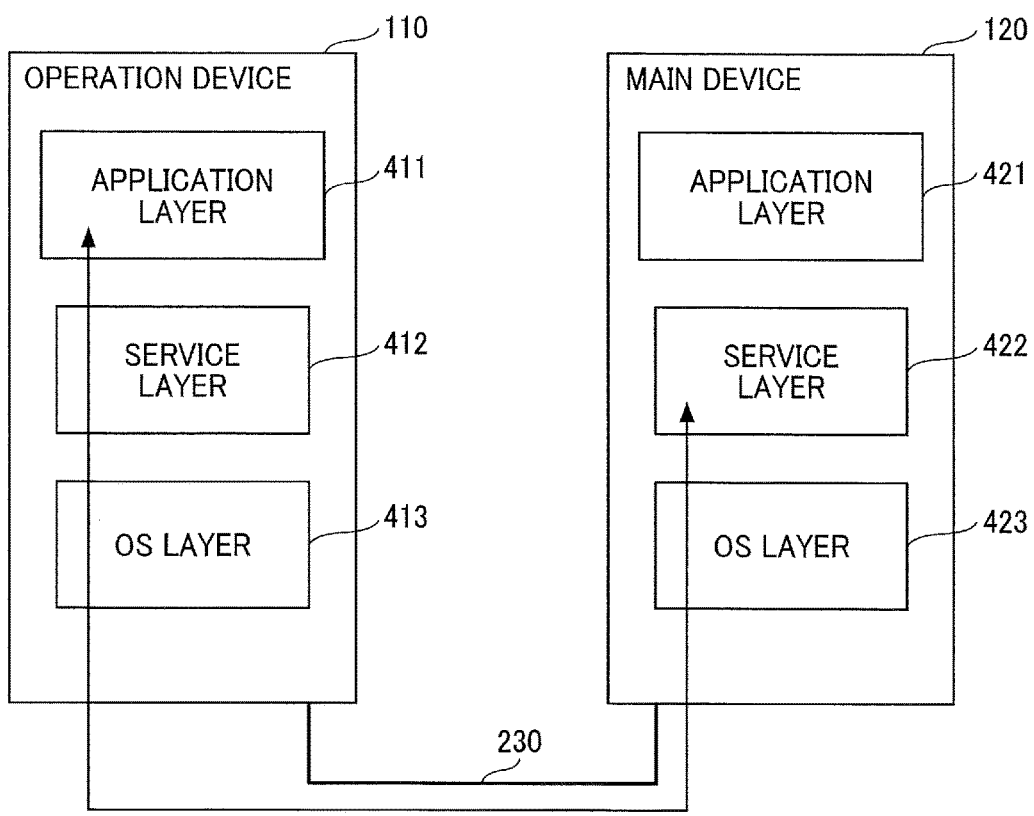
FIG. 4 is a block diagram illustrating an example of the software configurations of the operation device and the main device.

FIG. 4 is a block diagram illustrating an example of the software configurations of the operation device and the main device. The example illustrated in FIG. 4 indicates layered architectures of software configured with programs installed on the operation device 110 and the main device 120.

First, an explanation is given of the main device 120. In the present example, programs for building the application layer 421, the service layer 422, and the operating system layer (OS layer/hereinafter referred to as the "OS layer 423") are installed on an auxiliary storage device, or the like, of the main device 120.

Programs categorized into the application layer 421 operate the hardware resources of the image forming apparatus 100 to implement various functions. Specifically, programs categorized into the application layer 421 include, for example, a copy app, a facsimile app, a scan app, a printer app, or the like.

Programs categorized into the service layer 422 are programs interposed between the application layer 421 and the OS layer 423. For example, programs categorized into the service layer 422 implement an interface, etc., for programs of the application layer 421 to utilize a hardware resource of the main device 120 or for notifying the application layer 421 with a state of a hardware resource of the main device 120.

Furthermore, programs categorized into the service layer 422 receive an operation request for a hardware resource or arbitrate received operation requests. In addition, programs categorized into the service layer 422 sends an error notification to the application layer 421 for an error detected in a hardware resource. Note that operation requests received by the service layer 422 include, for example, an operation request for reading by a scanner, printing by a plotter, or the like.

Note that the role as the interface, which is implemented by programs categorized into the service layer 422, is the same for the application layer 411 of the operation device 110. That is, programs categorized into the application layer 411 of the operation device 110 are capable of accessing the service layer 422 and operating a hardware resource of the main device 120, so as to implement an image processing function, etc.

Programs categorized into the OS layer 423 are programs that are termed as basic software, etc. Further, programs categorized into the OS layer 423 provide a basic function for controlling the hardware resources of the main device 120. First, programs categorized into the service layer 422 convert an operation request for a hardware resource, which is issued by programs categorized into the application layer 421, into a command that can be interpreted by the OS layer 423, and the command is transmitted to the OS layer 423. Then, programs categorized into the OS layer 423 execute the command, so that an image processing function is implemented based on the operation request for the hardware resource. In addition, in a case where programs categorized into the OS layer 423 are executed, a hardware resource may receive a detected error. Then, the hardware resource transmits the received error notification to the service layer 422, which sends the error notification to the application layer 421.

Next, an explanation is given of the operation device 110. In the present example, programs for building the application layer 411, the service layer 412, and the OS layer 413 are installed on an auxiliary storage device, or the like, of the operation device 110.

However, the functions implemented by programs categorized into the application layer 411 and the types of operation requests that can be received by the service layer 412 are different from those of the main device 120. Specifically, in the operation device 110, programs categorized into the application layer 411 provides a user interface function for operating and displaying image processing functions mainly implemented by the main device 120.

Note that, in the present example, the OS of each of the operation device 110 and the main device 120 operates independently. In addition, the OS of each of the operation device 110 and the main device 120 need not be the same type as long as the operation device 110 and the main device 120 are capable of communicating with each other. For example, there may be such a configuration in which the operation device 110 employs Android (registered trademark) and the main device 120 employs Linux (registered trademark).

As described above, in the image forming apparatus 100, for example, the operation device 110 and the main device 120 are controlled by different OSs. Therefore, the communication between the operation device 110 and the main device 120 is not communication between processes in one device but communication between different devices. For example, the communication may be a command communication in which an operation from the user, which is received by the operation device 110, is sent to the main device 120 or may be an event communication in which the main device 120 instructs the operation device 110 to display a display screen (for example, an error notification or an error cancellation notification), etc.

<Example of the System Configuration>

Figure 5:
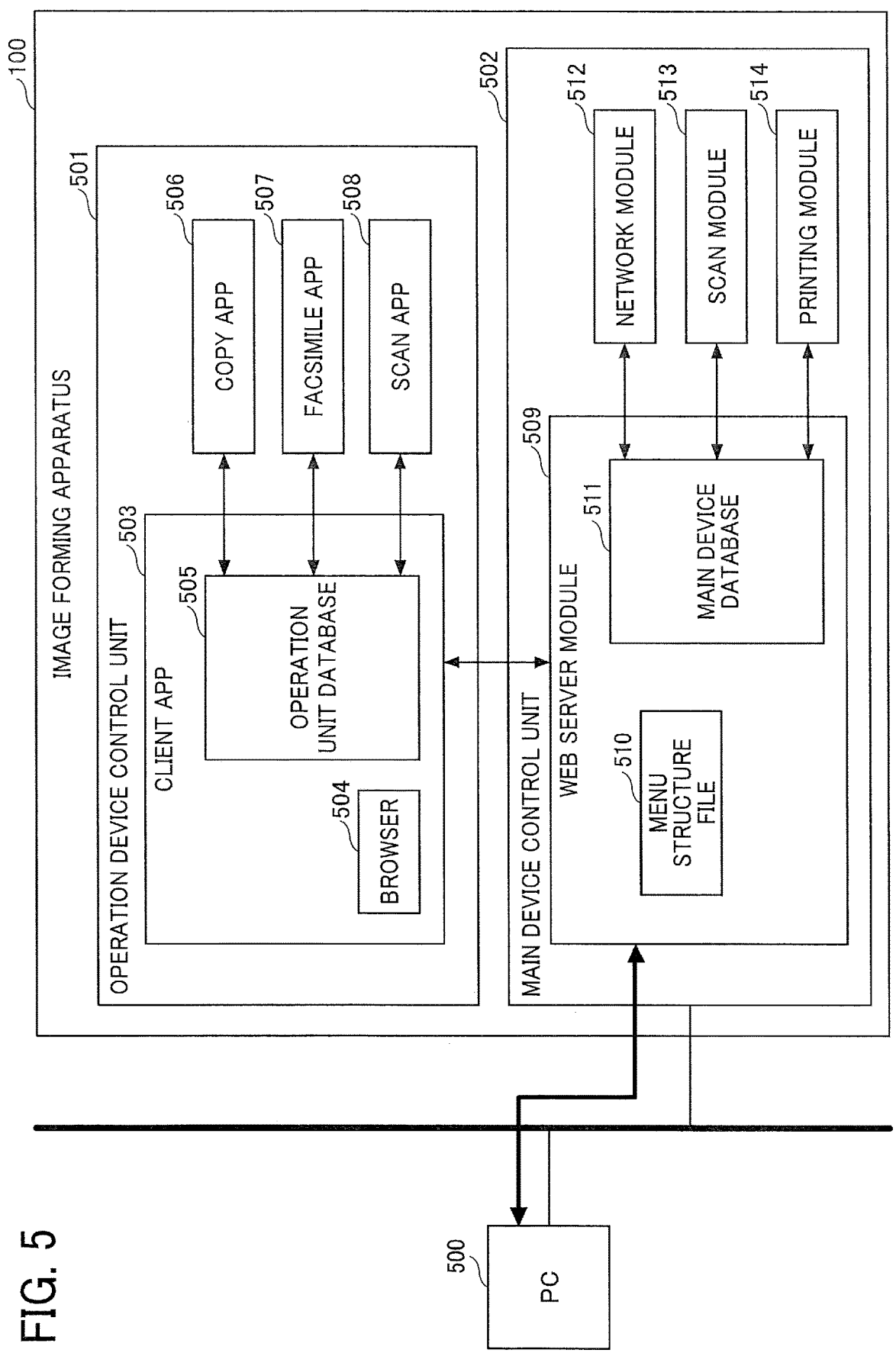
FIG. 5 is a block diagram illustrating an example of the system configuration of the image forming apparatus.

FIG. 5 is a block diagram illustrating an example of the system configuration of the image forming apparatus. For example, as illustrated in FIG. 5, the image forming apparatus 100 has a system configuration including an operation device control unit 501 on the operation device side and a main device control unit 502 on the main device side. Furthermore, the main device control unit 502 can be accessed from an external device. In the example illustrated in FIG. 5, a personal computer (PC/hereinafter referred to as the "PC 500") is an example of the external device.

The operation device control unit 501 is configured to control the operation device. For example, the operation device control unit 501 has a configuration including a client app 503 as illustrated in FIG. 5. Furthermore, the operation device is provided with application functions corresponding to installed application software. In the example illustrated in FIG. 5, the operation device has applications such as a copy app 506, a facsimile app 507, and a scan app 508. Note that the configuration of an application is determined based on installed programs. Therefore, a help service, etc., may be provided for an application.

The client app 503 is an example of an application for displaying an operation screen that receives an operation for the image forming apparatus 100. For example, the client app 503 has a configuration including a browser (hereinafter referred to as the "browser 504") and an operation unit database 505, as illustrated in FIG. 5.

For example, the browser 504 displays an operation screen, etc. Note that an operation screen may be displayed by software other than the browser 504. Therefore, the browser 504 may be software such as a native application preinstalled on the operation device as long as the software is capable of displaying the operation screen.

The operation unit database 505 is an example of a configuration for managing setting values for an application in the operation device control unit 501. Therefore, in the present example, the operation unit database 505 collectively manages setting values used by each application. Specifically, the operation unit database 505 sends and receives a setting value to and from each application. In addition, the items managed by the operation unit database 505 may be added by an installed program. Note that there may be such a configuration in which the operation unit database 505 is not included in the client app 503 but included in other software or the like.

The copy app 506 is an application for copying by the image forming apparatus 100.

The facsimile app 507 is an application for performing facsimile communication by the image forming apparatus 100.

The scan app 508 is an application for scanning an image described on printing paper, or the like, by the image forming apparatus 100.

Furthermore, for example, applications such as the copy app 506, the facsimile app 507, and the scan app 508, manage unique setting values in the respective applications. Noted that functions, etc., for setting a setting value need not be including in the respective applications.

The main device control unit 502 is configured to control the main device of the image forming apparatus 100. For example, the main device control unit 502 includes a web server module 509, as illustrated in FIG. 5. Furthermore, in the present example, the web server module 509 includes a menu structure file 510, a main device database 511, etc.

The web server module 509 collectively manages setting values on the main device side, for example. In addition, as illustrated in FIG. 5, the web server module 509 performs communication with the client app 503, etc. Then, the web server module 509 merges a menu, etc., that can be obtained by communication, so as to generate a menu structure. In the present example, the data indicating a menu structure is the menu structure file 510.

The menu structure file 510 is data storing a menu structure for a setting value in the image forming apparatus 100. Specifically, the menu structure file 510 indicates the category of each setting value in a menu structure and the layered architecture of categories in a menu structure, etc. Note that the details of the menu structure file 510 will be described later.

The main device database 511 is an example of a configuration for managing setting values in the main device control unit 502. Therefore, in the present example, the main device database 511 collectively manages the setting values used by each module. Specifically, the main device database 511 sends and receives a setting value to and from each module. In addition, the items managed by the main device database 511 may be added by an installed program. Noted that there may be such a configuration in which the main device database 511 is not included in the web server module 509 but included in another module, etc.

Furthermore, the main device is mounted with modules corresponding to installed software. In the example illustrated in FIG. 5, the main device includes modules such as a network module 512, a scan module 513, a printing module 514, an option management module 515, an authentication module 516, etc. Note that the module configuration is determined based on installed programs, etc. Note that, for example, there may be a module for a facsimile, etc.

The network module 512 performs communication using a network.

The scan module 513 scans an image using a scanner, etc.

The printing module 514 forms an image on printing paper, or the like, using a printing device, etc.

The option management module 515 manages devices connected to the image forming apparatus 100, which may be termed as options. Therefore, the option management module 515 monitors the configuration of the image forming apparatus 100.

The authentication module 516 authenticates the user's authority, etc.

The PC 500 is an information processing apparatus. Further, as illustrated in FIG. 5, the PC 500 is connected to the same network as the image forming apparatus 100. Moreover, in the present example, the PC 500 includes a browser. Therefore, in a case where the web server module 509 permits access from the PC 500, the PC 500 can remotely perform setting of the image forming apparatus 100. Note that the PC 500 is not necessary. Furthermore, the PC 500 may be any other type of information processing apparatus.

<Example of an Operation Screen>

With such a system configuration as described above, for example, screen data, a setting value, etc., are obtained and an operation screen is generated as described below, so that it is possible to display the operation screen and transition screens.

Figure 6:
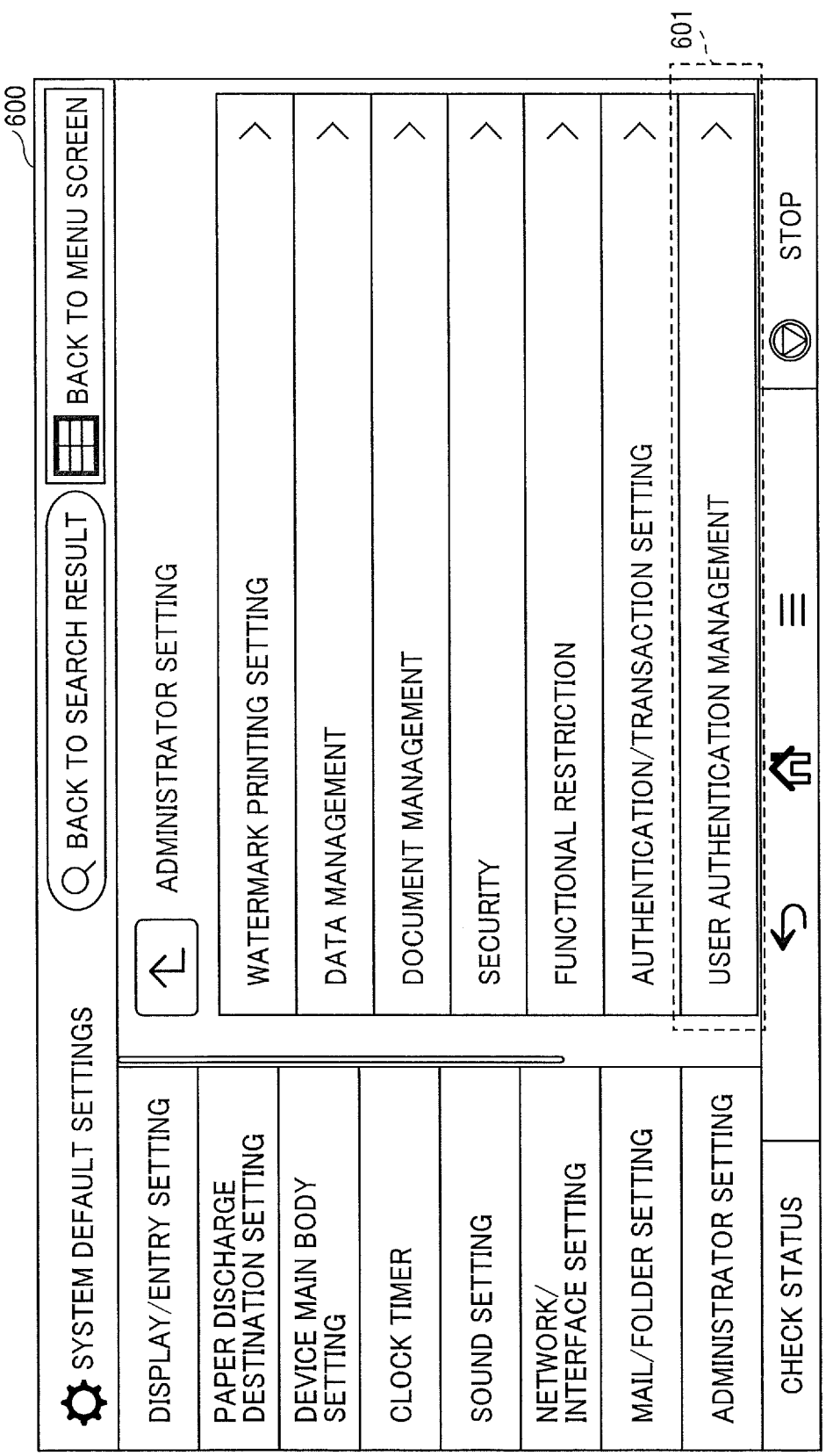
FIG. 6 is a diagram illustrating an example of an operation screen for selecting a category.

FIG. 6 is a diagram illustrating an example of an operation screen for selecting a category. Hereinafter, an explanation is given with such an example in which the first screen 600 is displayed by the operation device, or the client app, as illustrated in FIG. 6.

The first screen 600 displays settings separately for each category. In the example illustrated in FIG. 6, each of "WATERMARK PRINTING SETTING", "DATA MANAGEMENT", "DOCUMENT MANAGEMENT", "SECURITY", "FUNCTIONAL RESTRICTION", "AUTHENTICATION/TRANSACTION SETTING" and "USER AUTHENTICATION MANAGEMENT" on the first screen 600 is a graphical user interface (GUI) indicating the name of a category and functioning as a button for selection. By pressing one of these GUIs, the user can perform detailed settings for each category and check the details of the setting contents.

Hereinafter, an explanation is given of a case of performing an operation of pressing the button 601 for "USER AUTHENTICATION MANAGEMENT", for example. In response to such an operation, the first screen 600 transitions to such a screen as described below, for example.

Figure 7:
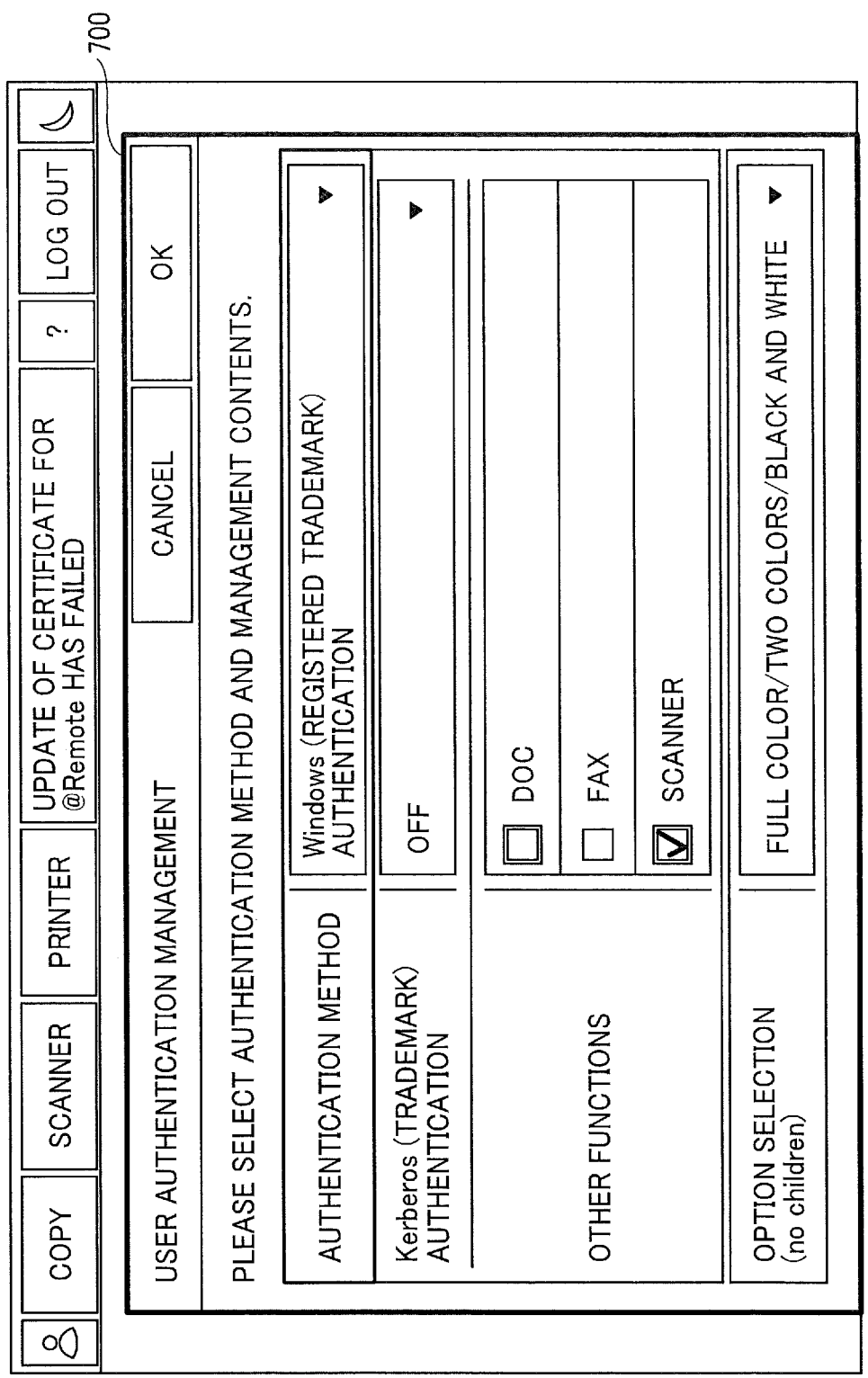
FIG. 7 is a diagram illustrating an example of an operation screen for performing detailed settings.

FIG. 7 is a diagram illustrating an example of an operation screen for performing detailed settings. For example, in a case where the button 601 is pressed on the first screen 600, the operation screen transitions so that the second screen 700 as illustrated in FIG. 7 is displayed.

The second screen 700 is an operation screen for checking and setting a setting value in "USER AUTHENTICATION MANAGEMENT". Specifically, on the second screen 700, the user can select "SCANNER", etc., as illustrated in FIG. 7 or select an option from a pull-down menu, so as to set a setting value. Furthermore, in the present example, in a case where the "OK" button is pressed, the setting values are confirmed and updated.

As described above, the operation screens transition from the first screen 600 to the second screen 700, for example. In this way, how operation screens transition, that is, the relationship between multiple operation screens is determined based on a menu structure file, etc. Furthermore, in the examples explained below, it is assumed that setting values to be set on operation screens are also determined based on a menu structure file.

<Examples of a Menu Structure and a Menu Structure File>

FIG. 8 is a diagram illustrating an example of a menu structure. Hereinafter, the menu structure 800 as illustrated in FIG. 8 is taken as an example for the explanation. Specifically, the present example has a menu structure of what is termed as a tree structure, in which "TOP" is the top layer. Therefore, according to the menu structure 800, the menus such as "SYSTEM", "FAX", "SCANNER", and "PRINTER" can be selected on the operation screen of "TOP". Next, for example, on the operation screen of "SYSTEM", it is possible to select the menus such as "BASIC", "NETWORK" and "ADMINISTRATOR". In this way, on an operation screen of an upper layer, it is possible to select a lower layer to be the transition destination. Then, upon selection, the operation screen transitions to the lower layer. Hereinafter, the layer of "TOP" is referred to as "FIRST LAYER". Further, the layer below "TOP" is referred to as "SECOND LAYER". Similarly, it is assumed that the present example has a layered architecture further including "THIRD LAYER", "FOURTH LAYER", and "FIFTH LAYER".

Thus, the menu structure file is the data defining the menu structure 800. Therefore, with the menu structure file, it is possible to specify what the structure is like from "TOP" to an operation screen for setting a setting value.

For example, according to the menu structure 800 illustrated in FIG. 8, transitions are performed as described below.

Figure 9A:
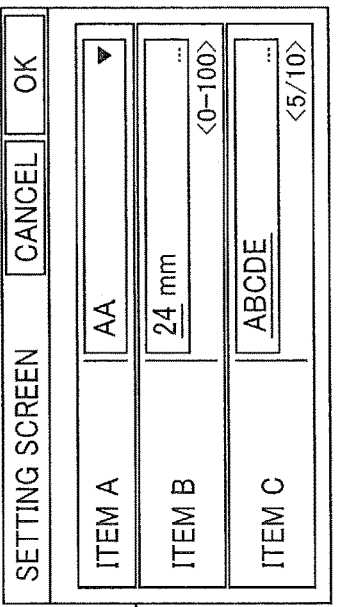
FIGS. 9A through 9C are diagrams illustrating an example of transition of operation screens.
Figure 9B:
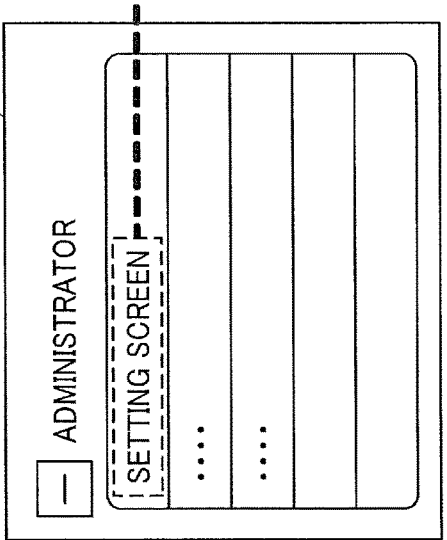
Figure 9C:
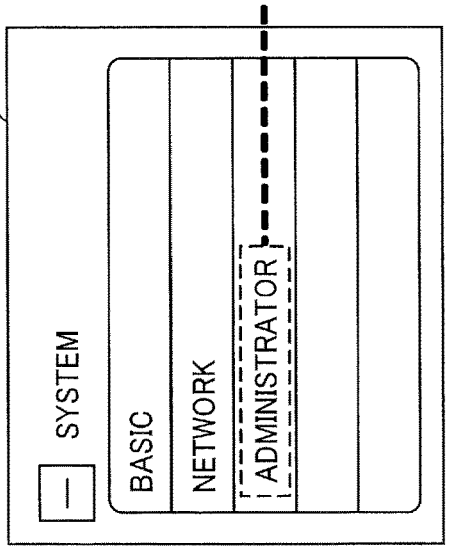

FIGS. 9A through 9C are diagrams illustrating an example of transition of operation screens. Hereinafter, an explanation is given with an example of the operation screens illustrated in FIGS. 9A through 9C, which are displayed in a case of operating "SYSTEM" in the menu structure 800.

In the present example, first, it is assumed that, in a case where the operation for switching from "TOP" to "SYSTEM" is performed, the screen illustrated in FIG. 9A (hereinafter referred to as the "second layer screen 901") is displayed. As illustrated in FIG. 9A, the second layer screen 901 is an example of an operation screen that allows the user to make selection from among three menus, that is, "BASIC", "NETWORK", and "ADMINISTRATOR", based on the menu structure file, etc.

That is, in a case where selection is made on the second layer screen 901, the operation screen transitions from display as illustrated in FIG. 9A to display as illustrated in FIG. 9B. Hereinafter, an explanation is given of an example in which the operation screen transitions from the second layer screen 901 to the screen illustrated in FIG. 9B (hereinafter referred to as the "third layer screen 902").

Furthermore, in the present example, in a case where selection is made on the third layer screen 902, the operation screen transitions from display as illustrated in FIG. 9B to display as illustrated in FIG. 9C. Hereinafter, an explanation is given of an example in which the operation screen transitions from the third layer screen 902 to the screen illustrated in FIG. 9C (hereinafter referred to as the "fourth layer screen 903").

The present example is an example of operation screens for the second layer screen 901 and the third layer screen 902 to change layers. That is, in the present example, the second layer screen 901 and the third layer screen 902 are screens configured with options that are termed as links.

The fourth layer screen 903 is an operation screen for setting setting values for "ITEM A", "ITEM B" and "ITEM C".

These operation screens are generated based on the definitions defined by such codes as described below, for example.

FIG. 10 is a diagram illustrating an example of the code for generating the third layer screen. For example, the third layer screen 902 is generated based on such a code as illustrated in FIG. 10.

FIG. 11 is a diagram illustrating an example of the code for generating the fourth layer screen. For example, the fourth layer screen 903 is generated based on such a code as illustrated in FIG. 11.

Specifically, "id" is a number, or the like, for identifying each operation screen. That is, in a case where "id" can be specified, it is possible to specify an operation screen in data such as a code.

"Title" is data indicating the name of a category. In the present example, "title" matches a block in the menu structure 800. Furthermore, in the present example, the characters entered in "title" are displayed in the upper left of an operation screen.

"Type" is set to "category" or "window". "Category" is a definition for an operation screen for changing layers, such as the second layer screen 901 and the third layer screen 902. "Window" is a definition for an operation screen for operating setting values, such as the fourth layer screen 903.

"Children" is a definition for operation screens in the lower layer. For example, in the menu structure 800, operation screens for "ITEM A", "ITEM B" and "ITEM C" are defined as the fifth layer, which is the lower layer of "SETTING SCREEN" of the fourth layer. Therefore, for the fourth layer screen 903, respective "id"s of "ITEM A", "ITEM B" and "ITEM C" are defined as "children". In this way, a tree structure such as the menu structure 800 is configured.

<Example of Setting Values>

For example, setting values such as "ITEM A", "ITEM B", and "ITEM C" can be set on such a setting screen as the fourth layer screen 903. Furthermore, setting values and setting screens are stored in such a form of a table or a database, for example. Specifically, in the example of the menu structure 800, it is assumed that "ITEM A" is stored in a table (hereinafter referred to as the "first table 801"). Similarly, in the example of the menu structure 800, it is assumed that "ITEM B" is stored in a table (hereinafter referred to as the "second table 802").

Specifically, for example, "ITEM B" is defined by the second table 802 as described below (Table 1).

example, in a case where "ADMINISTRATOR" is set, setting values can be set only by users with an administrator authority.

"Value" represents the destination from which a setting value is obtained.

In addition, there may be a setting value for "peripheral device". In the present example, it is indicated that "ITEM B" is a setting value used in a case where "FINISHER" is connected to the image forming apparatus as a peripheral device. In this way, "peripheral device" indicates the type of peripheral device to which the setting value is related, for example. In a case where a setting value is associated with a peripheral device in this way, it is possible to specify the type of peripheral device associated with each setting value.

Furthermore, such a table as described above (Table 1) is stored separately for the main device and the operation device.

For example, with such a menu structure file and table as explained above, it is possible for the image forming apparatus to display operation screens.

<Display Example of an Operation Screen for Setting a Setting Value>

For example, an operation screen for setting a setting value is generated and displayed as described below.

Figure 12:
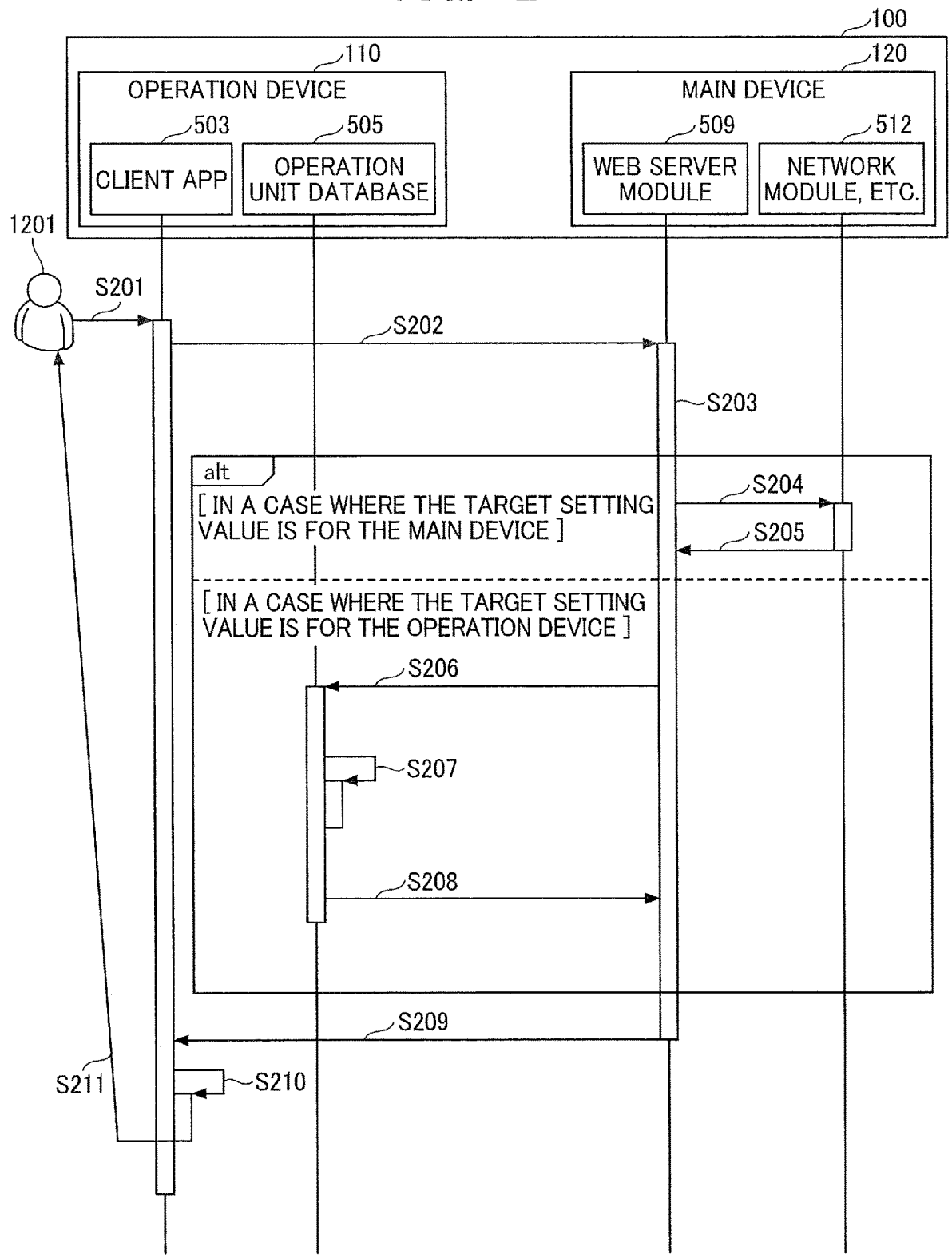
FIG. 12 is a sequence diagram illustrating an example of processing for generating and displaying an operation screen for setting a setting value.

FIG. 12 is a sequence diagram illustrating an example of processing for generating and displaying an operation screen for setting a setting value. For example, an explanation is given of a case in which an operation of selecting "SETTING SCREEN" is performed on the third layer screen 902. That is, the processing illustrated in FIG. 12 is processing for displaying a setting screen in response to an instruction from

TABLE 1

| id | title | type | min | max | step | access roll | value | peripheral device | ... |
|----|-------|------|-----|-----|------|-------------|-------|-------------------|-----|
| B | ITEM B | NUMERICAL VALUE ENTRY | 0 | 100 | 1 | ADMINISTRATOR | SCAN MODULE | FINISHER | ... |
| . | . | . | . | . | . | . | . | . | |
| . | . | . | . | . | . | . | . | . | |
| . | . | . | . | . | . | . | . | . | |

In the above (Table 1), "id" is an identification number, or the like, which is assigned for a setting value.

"Title" is the name of each setting value and setting screen.

"Type" indicates the type of form of entering a setting value. For example, "type" is set to "NUMERICAL VALUE ENTRY", "OPTION SELECTION", "CHARACTER ENTRY", or the like. In a case where "type" is set to "NUMERICAL VALUE ENTRY", the setting value is to be set in a numerical value. Furthermore, in a case where "type" is set to "OPTION SELECTION", the setting value is to be selected from options prepared in advance. Moreover, in a case where "type" is set to "CHARACTER ENTRY", the setting value is to be set in characters, etc.

"Min" is setting of the minimum value. Therefore, in a case where a value smaller than "min" is set as a setting value, an error will occur, for example.

"Max" is setting of the maximum value. Therefore, in a case where a value greater than "max" is set as a setting value, an error will occur, for example.

"Step" is setting of the number of steps.

"Access roll" represents an access authority. Specifically, "ADMINISTRATOR", "GUEST", or the like, is set. For the user (for example, in response to an operation of selecting the item of "SETTING SCREEN" in FIG. 9B by the user).

In S201, the client app 503 receives an operation of selecting "SETTING SCREEN".

In S202, the client app 503 issues an inquiry about setting values. Specifically, based on a menu structure file, etc., the client app 503 has information indicating that, in the menu structure, the setting values of "ITEM A", "ITEM B" and "ITEM C" are in the lower layer (in the present example, the fifth layer) of "SETTING SCREEN", as illustrated in FIG. 8. Furthermore, with the menu structure file, etc., "id"s for specifying "ITEM A", "ITEM B" and "ITEM C" can be identified, for example. Therefore, the client app 503 uses "id" of "ITEM A", "id" of "ITEM B", and "id" of "ITEM C" for the inquiry to the web server module 509, for example. In this way, the client app 503 requests the web server module 509 for the respective setting values of "ITEM A", "ITEM B" and "ITEM C".

Depending on the types, setting values may be divided into data stored in the main device and data stored in the operation device, etc. In such cases, the processing as described below may be performed.

It is possible that, in S203, the web server module 509 determines whether the setting value to be the target of the inquiry is a setting value for the main device or for the operation device.

However, the present embodiment is not limited to such an example as described below, and, for example, it is possible that setting values are managed consistently in the main device.

In the present example, it is assumed that, with "id", the web server module 509 is capable of determining whether the setting value to be the target of the inquiry is a setting value for the main device or for the operation device. Specifically, it is assumed that "id" has such a configuration and settings as described below.

TABLE 2

| | | id (higher-order bits) | id (higher-order bits) | id |
|---|---|---|---|---|
| SETTING VALUE FOR MAIN DEVICE | DESCRIPTION IN DECIMAL NUMBER | 3 | 101 | |
| | DESCRIPTION IN HEXADECIMAL NUMBER | 00000003 | 00000065 | 0000000300000065 |
| SETTING VALUE FOR OPERATION DEVICE | DESCRIPTION IN DECIMAL NUMBER | 11 | 10100001 | |
| | DESCRIPTION IN HEXADECIMAL NUMBER | 0000000b | 009a1d21 | 0000000b009a1d21 |
| SETTING VALUE FOR THIRD VENDER APP | DESCRIPTION IN DECIMAL NUMBER | 1677787392 | 2 | |
| | DESCRIPTION IN HEXADECIMAL NUMBER | 64010100 | 00000002 | 6401010000000002 |

For inquiries, data such as "id" as described above (Table 2) is used, for example. In the present example, it is assumed that, for management, data of "id" is divided into 8 digits of the higher-order bits and 8 digits of the lower-order bits (it is assumed that data of "id" consists of 16 digits).

As described above, in a case where the higher-order bits represent "3", it is determined that the setting value to be the target of the inquiry is a setting value for the main device. On the other hand, in a case where the higher-order bits represent "11", it is determined that the setting value to be the target of the inquiry is a setting value for the operation device. In addition, in a case where the higher-order bits represent "1677787392", it is determined that the setting value to be the target of the inquiry is a setting value for a third vender app. Then, in a case where it is determined that the setting value is a setting value for a third vender app, whether the setting value is a setting value for the main device or for the operation device is further determined.

Next, it is assumed that the web server module 509, etc., is capable of specifying setting values by use of lower-order bits. That is, the value of lower-order bits is a number for identifying a setting value.

Subsequently, in a case where it is determined that the setting value to be the target of the inquiry is a setting value for the main device ([IN A CASE WHERE THE TARGET SETTING VALUE IS FOR THE MAIN DEVICE]), the web server module 509 proceeds the processing to S204. On the other hand, in a case where it is determined that the setting value to be the target of the inquiry is a setting value for the operation device ([IN A CASE WHERE THE TARGET SETTING VALUE IS FOR THE OPERATION DEVICE]), the web server module 509 proceeds the processing to S206.

In S204, the web server module 509 makes an inquiry to a module such as the network module 512 for the setting value. Note that whether the destination of the inquiry is the network module 512 depends on the setting value.

In S205, the network module 512, or the like, responds to the web server module 509 with the setting value.

S204 and S205 are communication inside the main device, or what is termed as communication between processes. In this way, the web server module 509 makes an inquiry to each module for the setting value, which is the target of the inquiry. Accordingly, the web server module 509 obtains the up-to-date setting value in the setting.

In S206, the web server module 509 makes an inquiry to the operation unit database 505 for the setting value. For example, the inquiry is made based on a source code as described below.

FIG. 13 is an example of a source code for making an inquiry for a setting value. For example, in a case where an inquiry is made with such a code for specifying "id" as illustrated in FIG. 13 (hereinafter referred to as the "specification code 1601"), an inquiry for the setting value whose "id" is "0000000300000065" is made. Note that the inquiry may include such a setting as "fang" being "ja" as illustrated in FIG. 13, so that the language is set to Japanese.

In S207, the operation unit database 505 loads the database in response to the inquiry.

In S208, the operation unit database 505 responds to the inquiry with the setting value. For example, such a response as described below is made.

FIG. 14 is an example of a source code for responding to an inquiry for a setting value. Specifically, in the source code illustrated in FIG. 14, the response to the inquiry of S206 is based on the code for responding with the setting value of "title", etc. (hereinafter referred to as the "setting value code 1701").

That is, for the item specified by "id" in the specification code 1601, the response is made with the up-to-date setting value that is set in the application, the module, or the like, based on the setting value code 1701.

In S209, the web server module 509 provides a notification of the setting value, etc. That is, the web server module 509 obtains the setting value in S205 or S208, etc., based on the inquiry. Then, in S209, the web server module 509 notifies the client app 503 of the obtained setting value, etc.

In S210, the client app 503 renders the screen.

In S211, the client app 503 displays the rendered screen.

For example, a screen such as an operation screen is rendered and displayed as described below.

Figure 15:
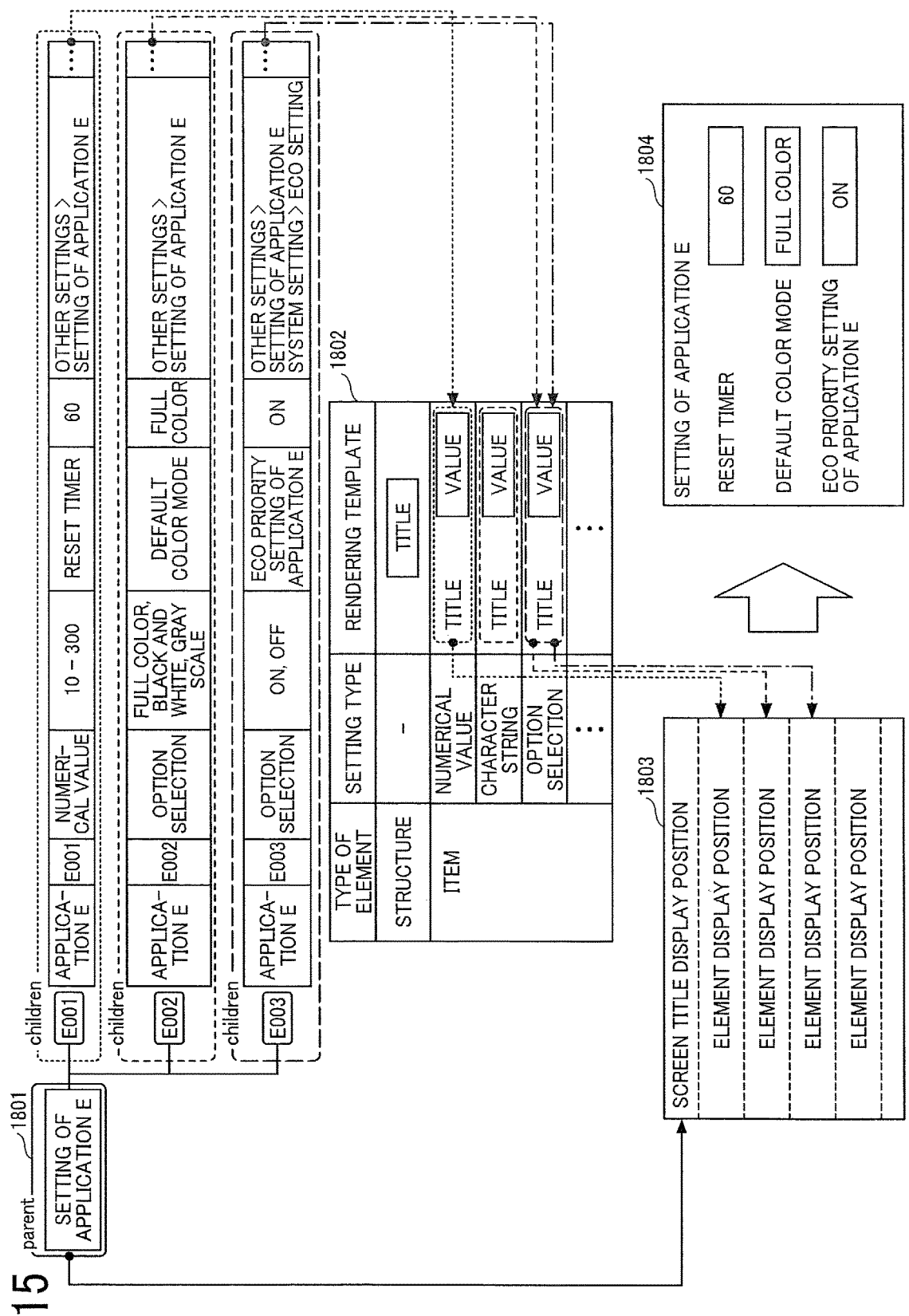
FIG. 15 is an image diagram of an example of processing for rendering a screen.

FIG. 15 is an image diagram of an example of processing for rendering a screen. The image diagram illustrated in FIG. 15 is an example of the processing for rendering the setting screen 1804 based on objects.

First, the system program, etc., renders "SCREEN TITLE DISPLAY POSITION" in the screen template 1803 with the setting value "SETTING OF APPLICATION E", which is set as "title" of "parent" (upper layer) in the setting structure 1801. Furthermore, the system program sequentially retrieves the elements of the "children" layers of the setting structure 1801. Next, the system program renders the screen template with the rendering templates 1802 corresponding to the setting type of the retrieved elements of "children".

For example, the system program firstly retrieves a rendering template whose setting type is "NUMERICAL VALUE TYPE", which corresponds to the setting type of the element of ID "E001" of "children" in the example illustrated in FIG. 15. Next, the system program performs rendering on the screen template 1803, that is, the system program renders the setting item of "RESET TIMER" of the setting screen 1804.

As with ID "E001", the system program retrieves a rendering template whose setting type is "OPTION SELECTION TYPE", which corresponds to the setting type of the element of ID "E002" of "children" in the example illustrated in FIG. 15. Next, the system program performs rendering on the screen template 1803, that is, the system program renders the setting item of "DEFAULT COLOR MODE" of the setting screen 1804.

Furthermore, as with ID "E001", the system program retrieves a rendering template whose setting type is "OPTION SELECTION TYPE", which corresponds to the setting type of the element of ID "E003" of "children" in the example illustrated in FIG. 15. Next, the system program performs rendering on the screen template 1803, that is, the system program renders the setting item of "ECO PRIORITY SETTING OF APPLICATION E" of the setting screen 1804.

As a result of such rendering, the system program can generate the setting screen 1804 for "APPLICATION E" that has been added, etc., and display the setting screen 1804 on the browser used by the image forming apparatus, for example.

By performing such processing as described above, it is possible to display such an operation screen and setting values as illustrated in FIG. 9C, for example.

<Example of Processing for Updating a Setting Value>

For example, in a case of updating a setting value, the processing as described below may be performed.

Figure 16:
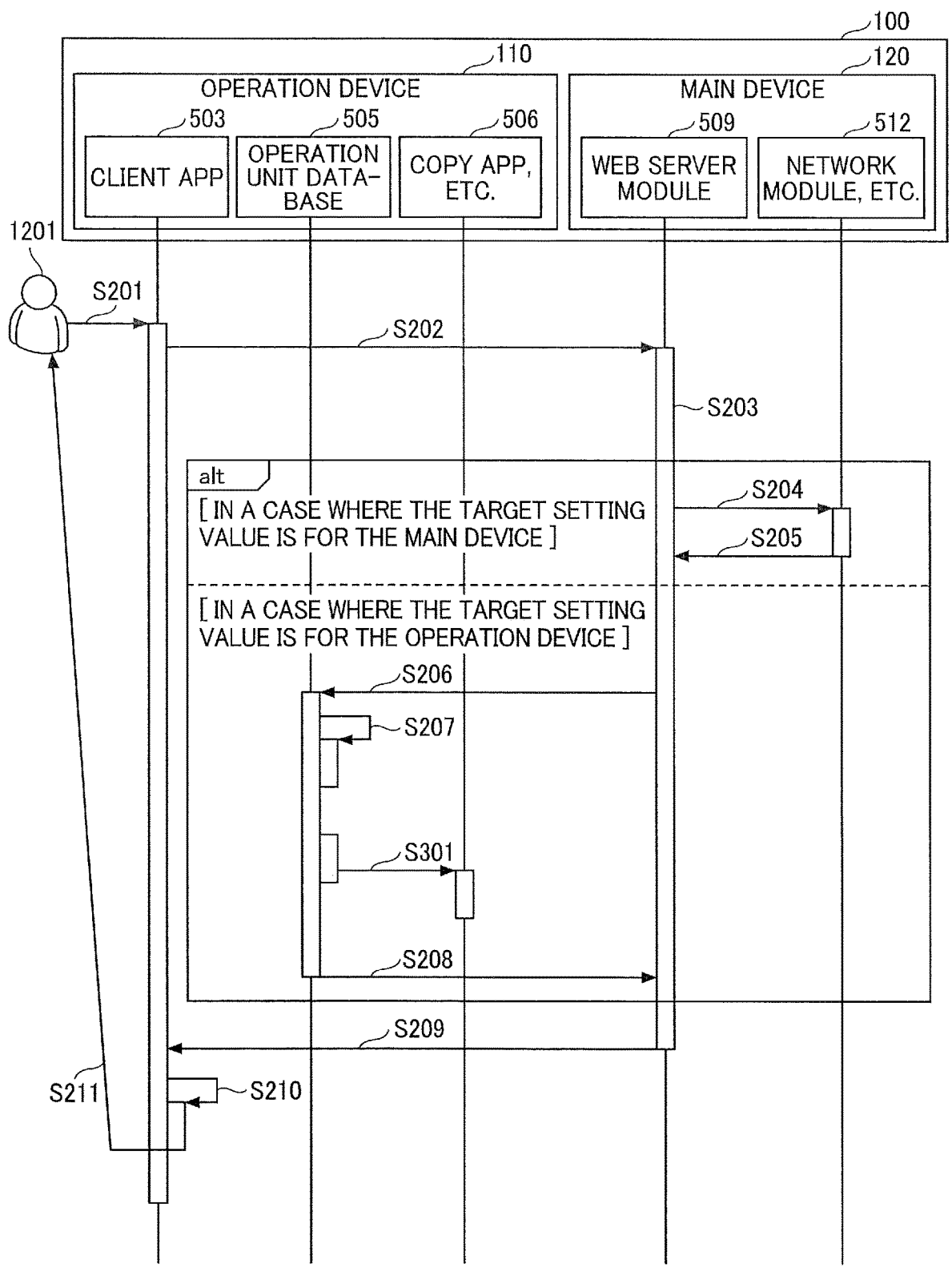
FIG. 16 is a sequence diagram illustrating an example of processing for updating and displaying a setting value.

FIG. 16 is a sequence diagram illustrating an example of processing for updating and displaying a setting value. That is, in the processing illustrated in FIG. 16, the user changes a setting value on a displayed setting screen (for example, in FIG. 9C, the user sets (changes) a setting value of "ITEM A", "ITEM B" or "ITEM C" and then presses the "OK" button). Hereinafter, an explanation is given with an example based on the processing illustrated in FIG. 12. Therefore, the same processes as those illustrated in FIG. 12 are denoted with the same reference signs, so as to omit duplicate explanations.

The processing illustrated in the present example is different in terms of S301 which is added.

Furthermore, in S201, the user 1201 further performs an operation of changing a setting value.

In S202, the client app 503 makes a request for writing a confirmed setting value.

In S204 and S206, the confirmed setting value is written.

In S205 and S208, a notification of the result of writing is provided.

In S209, the screen on the one-level upper layer is rendered.

In S301, the operation unit database 505 provides a notification of the updated setting value.

<About External Lock>

It is preferable that the image forming apparatus prioritizes settings performed from the operation device.

Specifically, the image forming apparatus may permit an operation for a setting value by use of a browser via a network. In this way, setting values can be set from the PC 500, etc. Therefore, in the case of such a setting, setting values can be set from the operation device as well as the PC 500, etc.

In such a case, it is preferable that the external lock is performed for the image forming apparatus, such that operations from the operation device are prioritized. Specifically, first, in a case where an operation with the operation device is started, the image forming apparatus performs the external lock for the target setting value or the entire image forming apparatus. In this way, in a case where the external lock is performed, operations performed from the PC 500, etc., are blocked during the time of the external lock. Therefore, operations performed from the operation device is prioritized over operations performed from the PC 500, etc.

Note that it is possible that the external lock is applied to operations performed from the PC 500, etc., as well. For example, the external lock may be applied for setting values, etc., in a case where a setting value is obtained, set, updated, or the like, based on an operation from the PC 500, etc.

In this way, for example, by prioritizing settings based on an operation from the operation device, settings by use of the operation device, that is, settings made by the user who is in front of the image forming apparatus can be prioritized.

<Example of the Data Structure and the Application Structure>

Figure 17:
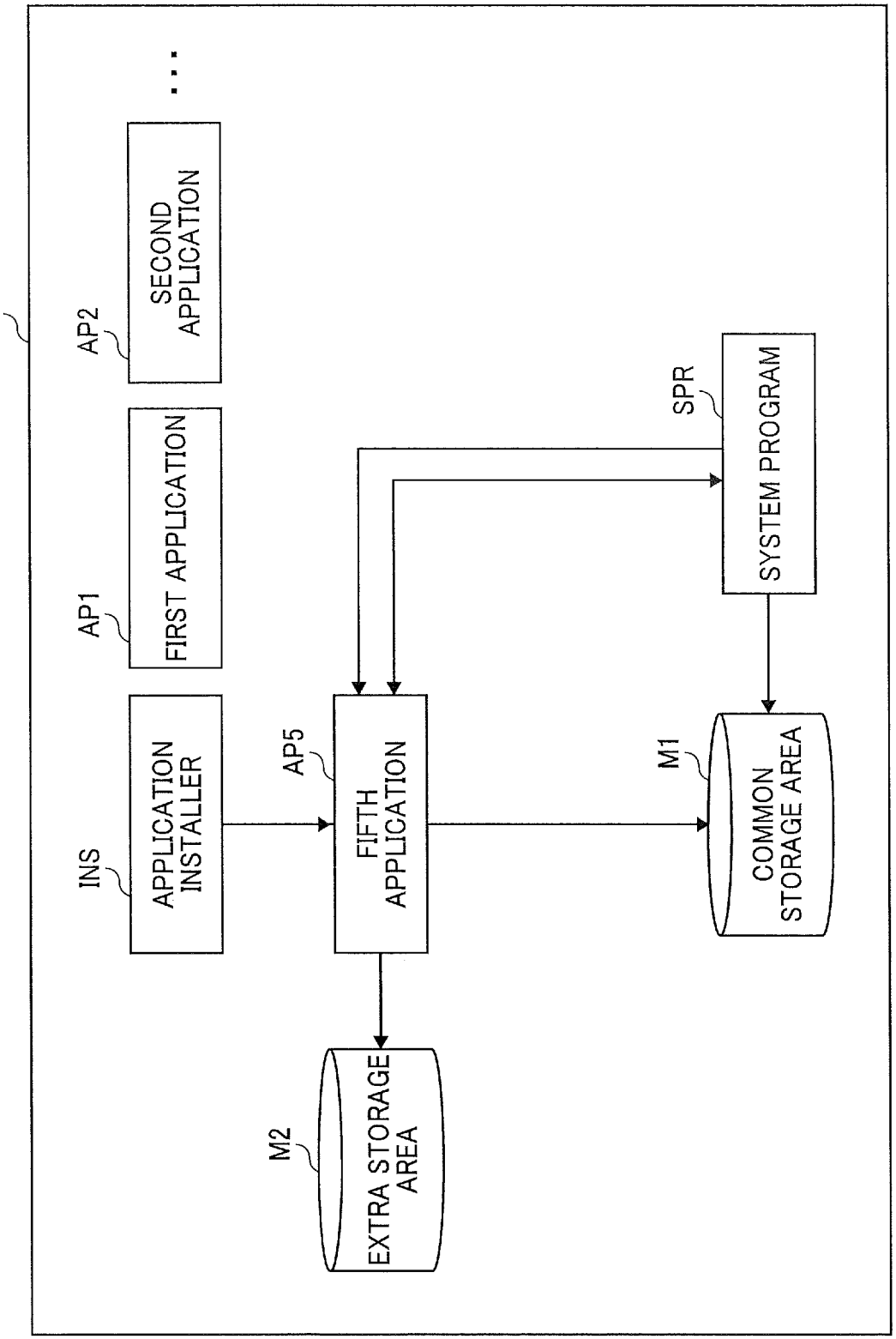
FIG. 17 is a block diagram illustrating an example of a data structure and an application structure.

FIG. 17 is a block diagram illustrating an example of the data structure and the application structure. For example, as illustrated in FIG. 17, applications such as the first application AP1 the second application AP2, etc., are preinstalled on the image forming apparatus 100. Furthermore, by use of the application installer INS, etc., it is possible to introduce an application such as the fifth application AP5 to the image forming apparatus 100.

Furthermore, as illustrated in FIG. 17, the image forming apparatus 100 includes a common storage area M1 that can be commonly used by the applications and the system program SPR, etc., for example. For example, in the common storage area M1, setting values, etc., are stored as described below (Table 3).

TABLE 3

| SETTING OWNER | ID | SETTING VALUE TYPE | RANGE OF ENTRY | TITLE | SETTING VALUE | ARRANGEMENT LOCATION | READING REQUEST | WRITING REQUEST | ... |
|---|---|---|---|---|---|---|---|---|---|
| FIRST APPLICATION | A001 | NUMERICAL VALUE | 0-10 | NUMBER OF RETRIES | 3 | OTHER SETTINGS > SETTING OF FIRST APPLICATION | — | — | ... |
| FIRST APPLICATION | A002 | NUMERICAL VALUE | 10-1000 | INTERVAL OF RETRIES | 100 | OTHER SETTINGS > SETTING OF FIRST APPLICATION | — | — | ... |
| SECOND APPLICATION | B001 | CHARACTER STRING | 0-100 CHARACTERS | NOTIFICATION FROM ADMINISTRATOR | "THE DEVICE IS UNAVAILABLE FOR USE ON EVERY SUNDAY" | SYSTEM SETTING > ADMINISTRATOR SETTING | — | — | ... |
| . . . | . . . | . . . | . . . | . . . | . . . | . . . | . . . | . . . | . |
| FIFTH APPLICATION | E001 | CHARACTER STRING | 8-255 CHARACTERS | PASSWORD | — | OTHER SETTINGS > SETTING OF FIFTH APPLICATION | SETTING VALUE | SETTING VALUE | |
| FIFTH APPLICATION | E002 | OPTION SELECTION | FULL COLOR, BLACK AND WHITE, GRAY SCALE | DEFAULT COLOR MODE | FULL COLOR | OTHER SETTINGS > SETTING OF FIFTH APPLICATION | — | — | ... |
| FIFTH APPLICATION | E003 | OPTION SELECTION | ON, OFF | ECO PRIORITY SETTING OF FIFTH APPLICATION | ON | OTHER SETTINGS > SETTING OF FIFTH APPLICATION, SYSTEM SETTING > ECO SETTING | — | — | ... |
| . . . | . . . | . . . | . . . | . . . | . . . | . . . | . . . | . . . | . |

"SETTING OWNER" in the above (Table 3) is the entity that sets the setting value. Specifically, in a case where "SETTING OWNER" is "FIRST APPLICATION", it is indicated that the setting value is set and utilized by the first application.

"ID" is an identification number, or the like. That is, in a case where an "ID" is specified, the setting value is specified.

"SETTING VALUE TYPE" indicates the format of the setting value. For example, in a case of "NUMERICAL VALUE", a numerical value is to be set as the setting value. Furthermore, in a case of "CHARACTER STRING", characters, etc., are to be set as the setting value. In a case of "OPTION SELECTION", the setting value is selected from options, which are entered in "RANGE OF ENTRY" in advance, to be set. Note that there may be another format of "SETTING VALUE TYPE" other than the above. Furthermore, in the processing illustrated in FIG. 15, etc., "SETTING VALUE TYPE" corresponds to the setting type.

"RANGE OF ENTRY" indicates the range, types, options, or the like, that can be entered as the setting value. Specifically, in a case of "0-10," a value in the range of "0" to "10" is to be set as the setting value. Therefore, a value outside the "RANGE OF ENTRY" is judged as an error.

"TITLE" indicates characters, or the like, for explaining the setting value displayed on the setting screen, etc.

"SETTING VALUE" indicates the setting value that is currently set. Note that "–" indicates that there is not a setting value saved in the common storage area M1. That is, for example, it is indicated that the setting value is saved in an extra storage area M2, or the like, as illustrated in FIG. 17.

"ARRANGEMENT LOCATION" indicates the position relative to the home screen in such a case where each setting value is set by a GUI and the setting values and setting screens have a tree structure. For example, the setting "OTHER SETTINGS>SETTING OF FIRST APPLICATION" indicates that, in a case where the "OTHER SETTINGS" button is pressed on the first setting screen and then the "SETTING OF FIRST APPLICATION" button is pressed on the next setting screen, the setting screen for setting the target setting value will appear.

Hereinafter, an explanation is given with an example of a case in which setting values and control information, etc., are stored in such a storage unit as described above (Table 3).

Note that all of the setting values and control information, etc., may be stored in one storage area. Alternatively, as illustrated in FIG. 17, there may be such a configuration in which the setting values and control information, etc., are separately or redundantly stored in multiple storage areas.

<Example of the Functional Configuration>

Figure 18:
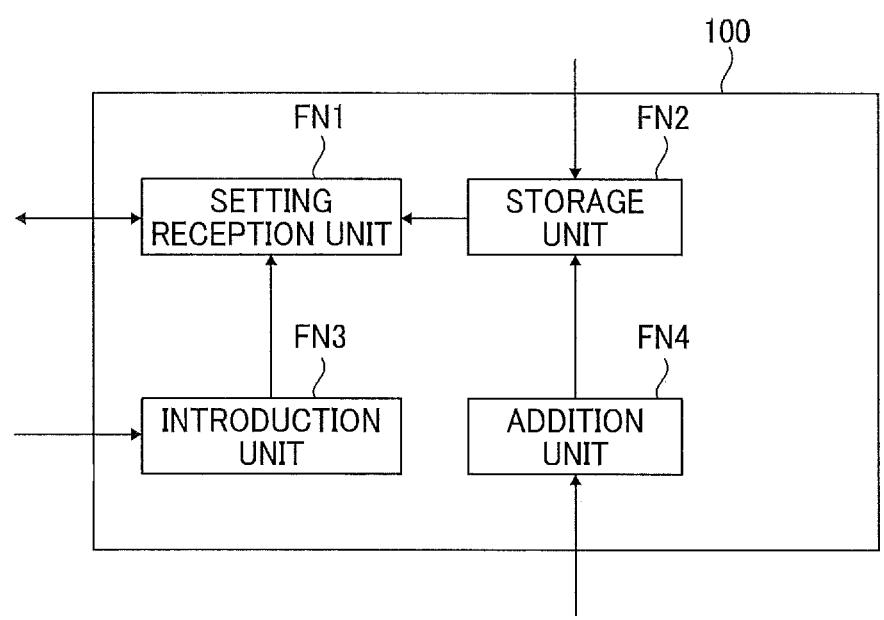
FIG. 18 is a functional block diagram illustrating an example of the functional configuration of the image forming apparatus.

FIG. 18 is a functional block diagram illustrating an example of the functional configuration of the image forming apparatus. For example, the image forming apparatus 100 has a functional configuration including a setting reception unit FN1, a storage unit FN2, and an introduction unit FN3. Furthermore, it is preferable that the image forming apparatus 100 has a functional configuration further including an addition unit FN4. Hereinafter, the functional configuration illustrated in FIG. 18 is taken as an example for the explanation.

The setting reception unit FN1 performs a setting reception procedure for receiving a user operation for executing an application on a setting screen where entry of a setting value for the application is received. For example, the setting reception unit FN1 is implemented by the operation device 110, etc.

The storage unit FN2 performs a storage procedure for storing control information utilized for displaying a setting screen. For example, the storage unit FN2 is implemented by the HDD 224, etc.

The introduction unit FN3 performs an introduction procedure for performing the process for introducing an application. For example, the introduction unit FN3 is implemented by the CPU 211, etc.

The addition unit FN4 performs an addition procedure for displaying a GUI, etc., for receiving a user operation. For example, the addition unit FN4 is implemented by the CPU 211, etc.

Note that the functional configuration is not limited to as illustrated in FIG. 18. For example, the functional configuration may include more functions other than the functions illustrated in FIG. 18.

<Example of the Overall Processing>

Figure 19:
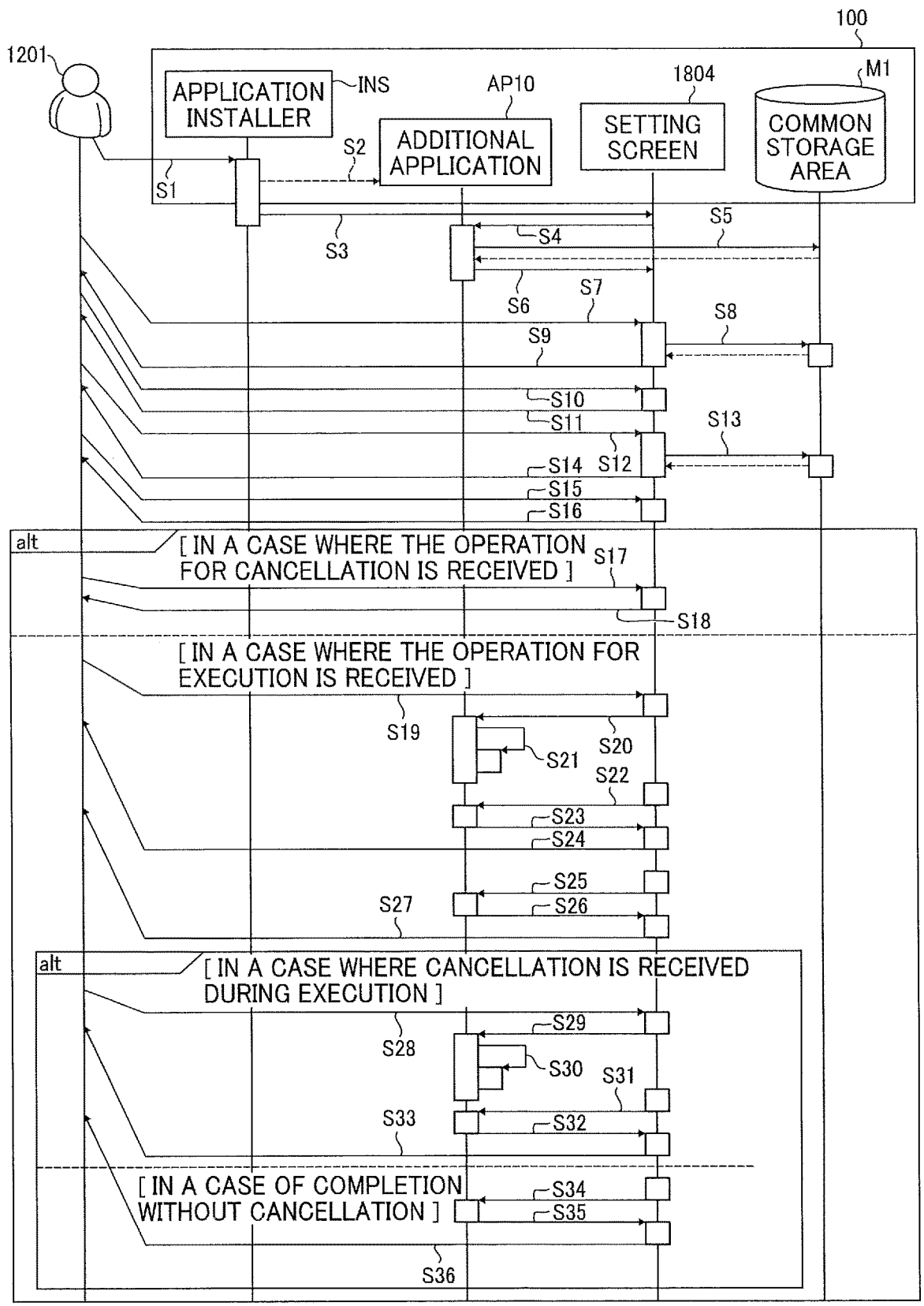
FIG. 19 is a sequence diagram illustrating an example of the overall processing.

FIG. 19 is a sequence diagram illustrating an example of the overall processing. For example, the image forming apparatus 100 performs the processing as illustrated in FIG. 19 for receiving the user operation for executing an application on a setting screen.

Hereinafter, an explanation is given with an example of the case in which the additional application AP10 (which corresponds to the fifth application AP5, etc., in the application configuration illustrated in FIG. 17) is introduced.

In S1, the application installer INS installs the additional application AP10. For example, as illustrated in FIG. 19, in a case where the user 1201 provides an operation for installing the additional application AP10, the application installer INS starts installation of the additional application AP10.

In S2, the application installer INS outputs what is termed as a Create message, etc. In other words, it is indicated that the installation of the additional application AP10 has been completed and the additional application AP10 is thereafter in an executable state.

In S3, the application installer INS notifies the setting screen 1804, etc., that the additional application AP10 has been installed.

In S4, the setting screen 1804 makes a request for storing setting values, etc.

In S5, the additional application AP10 writes the setting values, etc., to the common storage area M1, etc.

In S6, the additional application AP10 makes a response indicating that the setting values have been stored.

In S7, the setting screen 1804 is controlled to be displayed in a case where the user 1201 provides an operation for calling the setting screen 1804.

In S8, the setting screen 1804 retrieves setting values, etc.

In S9, the setting screen 1804 displays the setting values, etc. For example, it is assumed that such a setting screen as described below is displayed.

Figure 20:
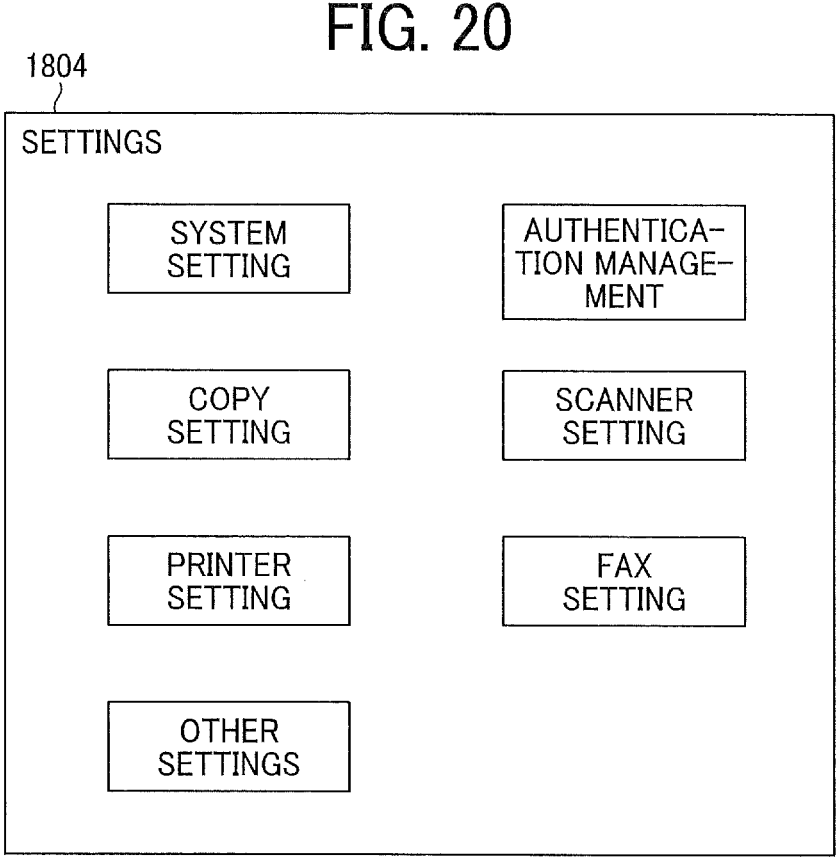
FIG. 20 is a diagram illustrating an example of a setting screen.

FIG. 20 is a diagram illustrating an example of a setting screen. In the setting screen illustrated in FIG. 20, user operations for setting values used for various functions are received by GUIs such as buttons. In the present example, it is assumed that, in a case where the "OTHER SETTINGS" button is pressed, the screen transitions to a screen on which operations for setting values of applications can be performed.

In S10, the setting screen 1804 receives an operation of pressing the "OTHER SETTINGS" button.

In S11, the setting screen 1804 transitions the screens as described below, for example.

Figure 21:
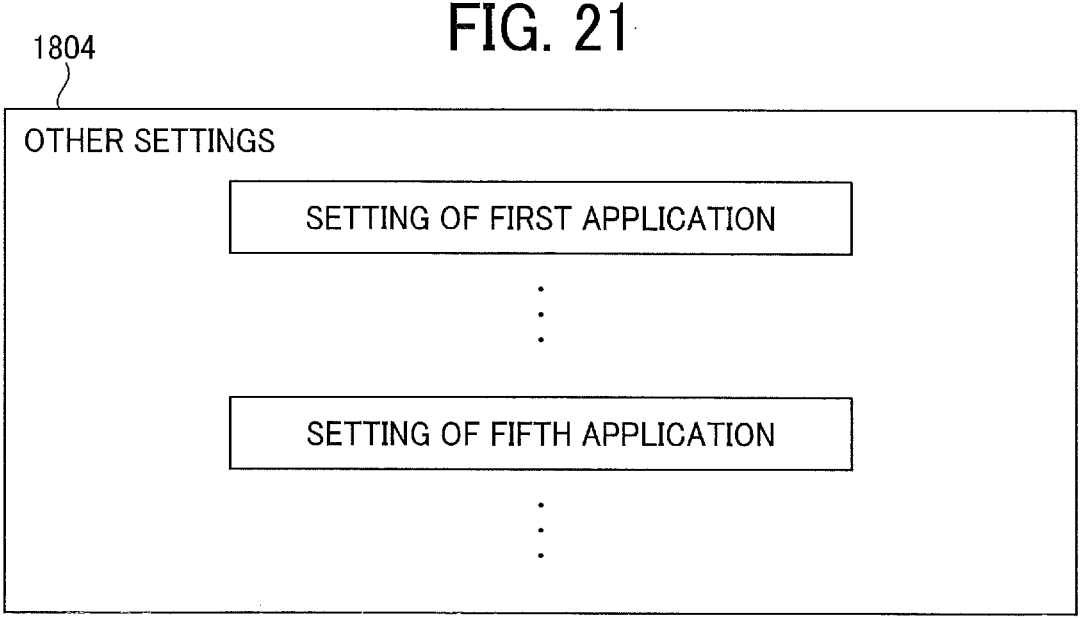
FIG. 21 is a diagram illustrating an example of transition of setting screens.

FIG. 21 is a diagram illustrating an example of transition of setting screens. As illustrated in FIG. 21, the setting screen 1804 displays a screen for receiving an operation for applications. In the present example, in a case where the "SETTING OF FIFTH APPLICATION" button is pressed, the setting screen 1804 transitions to a screen for receiving a user operation for setting values, etc., of the fifth application, for example.

In S12, the setting screen 1804 receives an operation of pressing the "SETTING OF FIFTH APPLICATION" button.

In S13, the setting screen 1804 retrieves setting values, etc.

In S14, the setting screen 1804 transitions the screens as described below, for example.

Figure 22:
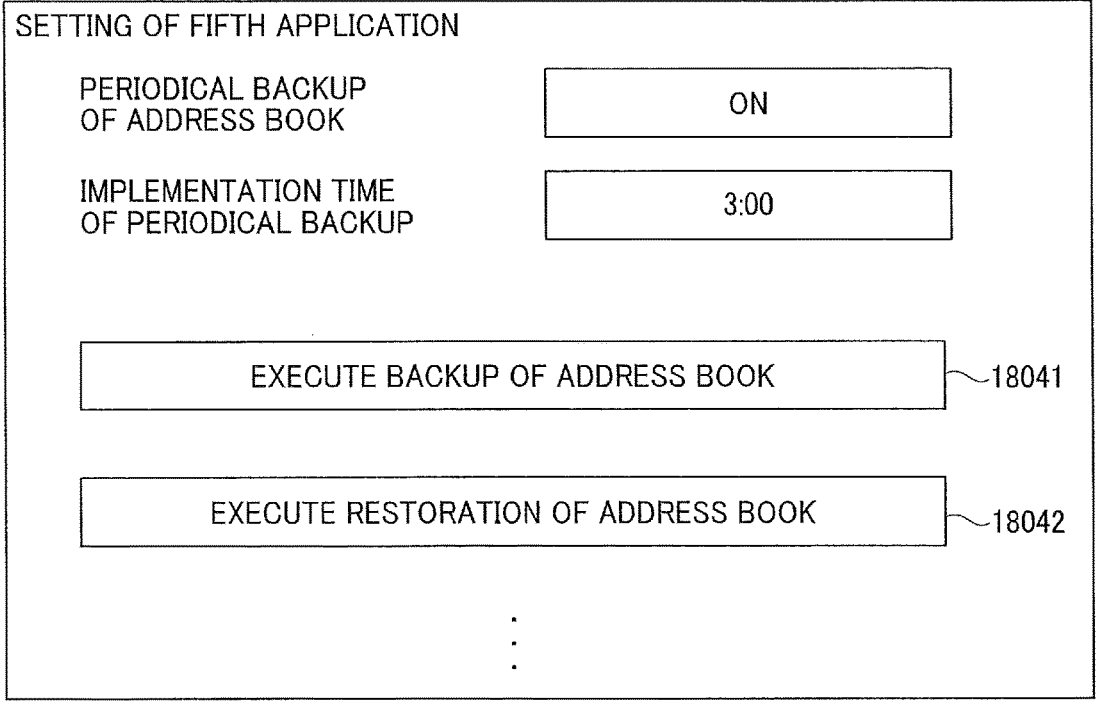
FIG. 22 is a diagram illustrating an example of transition of setting screens.

FIG. 22 is a diagram illustrating an example of transition of setting screens. For example, on the setting screen 1804, the user operation to the button for executing an application that backs up an address book (hereinafter referred to as the "backup execution button 18041") is received.

Similarly, on the setting screen 1804, the user operation to the button for executing an application that restores an address book (hereinafter referred to as the "restoration execution button 18042") is received.

Hereinafter, an explanation is given with an example of the case in which the backup execution button 18041 is pressed, that is, the case in which an operation for causing an application to back up an address book is performed.

In S15, the setting screen 1804 receives the operation of pressing the backup execution button 18041.

In S16, the setting screen 1804 transitions the screens as described below, for example.

Figure 23:
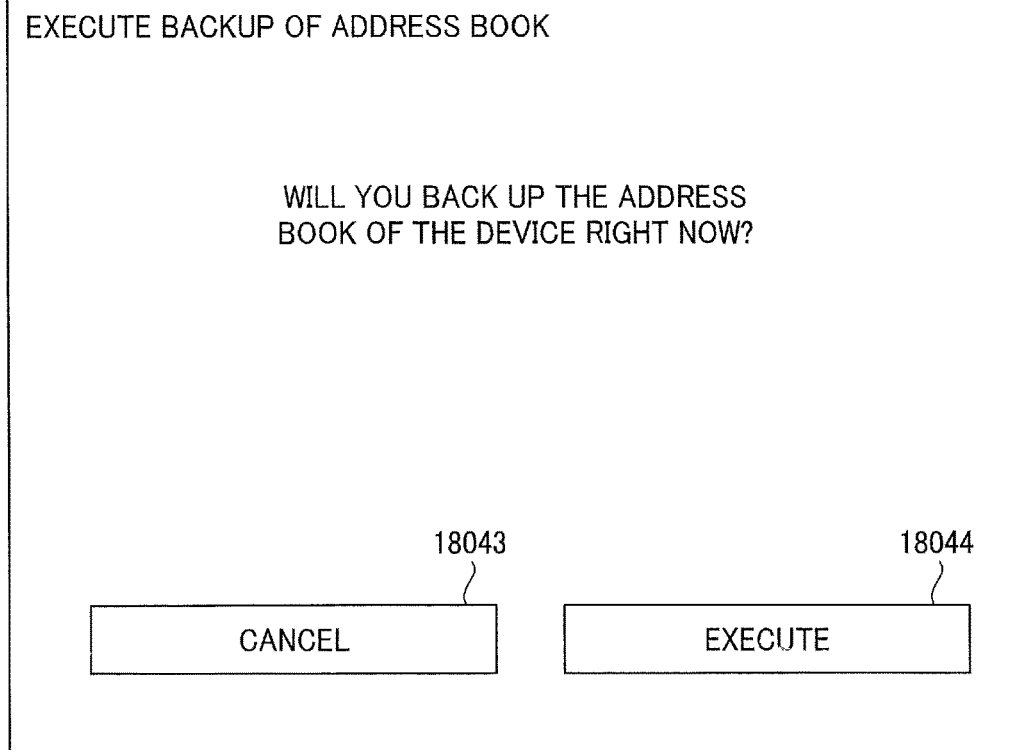
FIG. 23 is a diagram illustrating an example of transition of setting screens.

FIG. 23 is a diagram illustrating an example of transition of setting screens. For example, the setting screen 1804 displays a cancellation operation button 18043 and an execution operation button 18044 as illustrated in FIG. 23.

The execution operation button 18044 is an example of a GUI for receiving a user operation for executing the application.

The cancellation operation button 18043 is an example of a GUI for receiving a user operation for cancelling execution of the application.

For example, in a case where the execution operation button 18044 is pressed ([IN A CASE WHERE THE OPERATION FOR EXECUTION IS RECEIVED]), the image forming apparatus proceeds the processing to S19. On the other hand, in a case where the cancellation operation button 18043 is pressed ([IN A CASE WHERE THE OPERATION FOR CANCELLATION IS RECEIVED]), the image forming apparatus proceeds the processing to S17.

In S17, the setting screen 1804 receives the operation of pressing the cancellation operation button 18043.

In S18, the setting screen 1804 transitions to the screen as illustrated in FIG. 22, for example.

In S19, the setting screen 1804 receives the operation of pressing the execution operation button 18044.

In S20, the setting screen 1804 calls the additional application AP10 by use of an execution I/F.

In S21, the additional application AP10 executes predetermined processing. In the present example, the additional application AP10 backs up an address book.

In S22, the setting screen 1804 requests the additional application AP10 for information indicating the state of execution, etc.

In S23, the setting screen 1804 receives a response to the request from the additional application AP10.

In S24, the setting screen 1804 transitions the setting screens as described below, based on the response in S23, for example.

Figure 24:
FIG. 24 is a diagram illustrating an example of a setting screen during execution.

FIG. 24 is a diagram illustrating an example of the setting screen during execution. As illustrated in FIG. 24, for example, the setting screen 1804 displays the degree of progress of the processing by the additional application, such as "0%". Note that the degree of progress is a value that changes on a real time basis depending on the degree of completion of the processing. In addition, the setting screen 1804 may also include a GUI and display other than the degree of progress and the cancellation operation button 18043.

After a predetermined time has elapsed, the processes of S25 to S27 are performed. For example, S25 to S27 are executed in the same way as S22 to S24.

In S25, the setting screen 1804 requests the additional application AP10 for information indicating the state of execution, etc.

In S26, the setting screen 1804 receives a response to the request from the additional application AP10.

In S27, the setting screen 1804 transitions the setting screens as described below, based on the response in S26, for example.

Figure 25:
FIG. 25 is a diagram illustrating an example of a setting screen during execution.

FIG. 25 is a diagram illustrating an example of the setting screen during execution. Compared to FIG. 24, the difference is that, in FIG. 25, the processing has progressed and the degree of progress has become "50%".

Then, in a case where an operation to the cancellation operation button 18043 is received on such a setting screen 1804 as illustrated in FIG. 24 or FIG. 25 (corresponding to [IN A CASE WHERE CANCELLATION IS RECEIVED DURING EXECUTION] in FIG. 19), the setting screen 1804 proceeds the processing to S28. On the other hand, in a case where there is no operation to the cancellation operation button 18043 and the processing is completed (corresponding to [IN A CASE OF COMPLETION WITHOUT CANCELLATION] in FIG. 19), the setting screen 1804 proceeds the processing to S34.

In S28, the setting screen 1804 receives the operation for cancellation.

In S29, the setting screen 1804 calls the additional application AP10 by use of the cancellation I/F.

In S30, the additional application AP10 cancels the predetermined processing. In the present example, the additional application AP10 cancels backup of an address book. In a case where the processing of cancelling the processing is completed, the processes of S31 to S33 are performed, for example.

In S31, the setting screen 1804 requests the additional application AP10 for information indicating the state of execution, etc.

In S32, the setting screen 1804 receives a response to the request from the additional application AP10.

In S33, the setting screen 1804 transitions the setting screens as described below, based on the response in S32, for example.

FIG. 26 is a diagram illustrating an example of the setting screen in a case where processing is canceled during execution. For example, as illustrated in FIG. 26, the setting screen 1804 displays the result of cancelling the processing.

In S34, the setting screen 1804 requests the additional application AP10 for information indicating the state of execution, etc.

In S35, the setting screen 1804 receives a response to the request from the additional application AP10.

In S36, the setting screen 1804 transitions the setting screens as described below, based on the response in S35, for example.

FIG. 27 is a diagram illustrating an example of the setting screen in a case where execution is completed without cancellation. As illustrated in FIG. 27, the setting screen 1804 indicates, for example, that the degree of progress is "100%", that is, that all processing has been completed.

As described above, the image forming apparatus is capable of receiving a user operation for performing execution or cancelling execution of an application on a setting screen where a setting value, etc., for the application is entered. For implementing such a setting screen, the image forming apparatus has such a configuration as described below, for example.

<Example of the Setting Structure>

Figure 28:
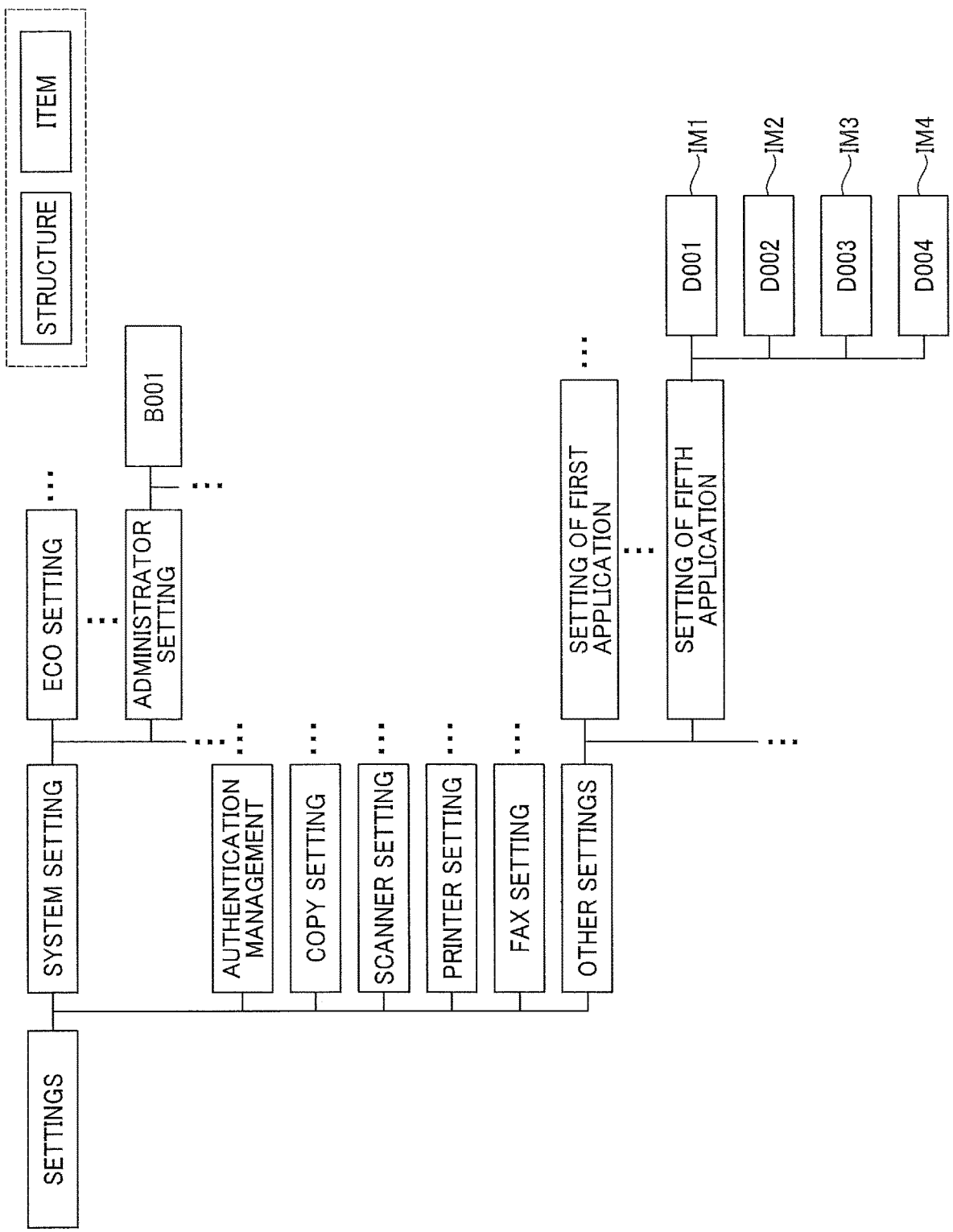
FIG. 28 is a diagram illustrating an example of a setting structure.

FIG. 28 is a diagram illustrating an example of the setting structure. Hereinafter, an explanation is given of an example of the case in which the additional application in such a setting structure as illustrated in FIG. 28 is the "fifth application".

As illustrated in FIG. 28, "SETTING OF FIFTH APPLICATION" is one structure of the setting structure, and, in the present example, one structure corresponds to one setting screen. For example, in the menu structure illustrated in FIG. 8, "SETTING OF FIFTH APPLICATION" corresponds to "FOURTH LAYER".

Furthermore, in the present example, "SETTING OF FIFTH APPLICATION" includes four items of "D001" to "D004". Hereinafter, "D001" is referred to as the "first item IM1", "D002" is referred to as the "second item IM2", "D003" is referred to as the "third item IM3", and "D004" is referred to as the "fourth item IM4". Such a setting structure is prepared in advance, and a setting screen is displayed by such processing as described below, which is performed for each setting screen, for example.

<Example of Processing for Displaying a Setting Screen>

Figure 29:
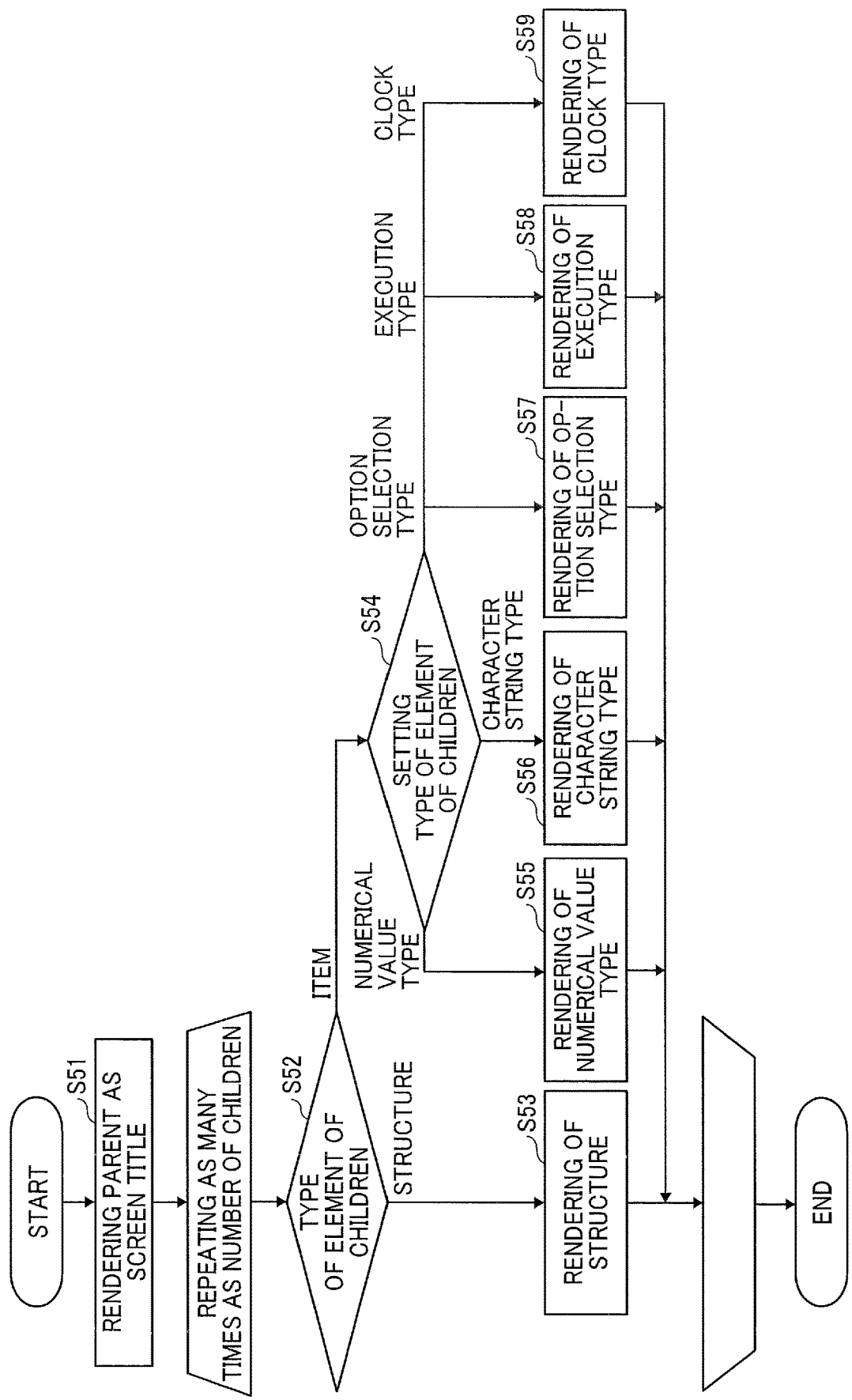
FIG. 29 is a flowchart illustrating an example of processing for displaying a setting screen.

FIG. 29 is a flowchart illustrating an example of the processing for displaying a setting screen.

In S51, the system program, etc., renders the value of "title" of "parent" for "SCREEN TITLE DISPLAY POSITION" of the screen template. Subsequently, the processing of S52 to S59 is repeated as many times as the number of "children".

Since "parent" is "SETTING OF FIFTH APPLICATION" in the present example, "SETTING OF FIFTH APPLICATION" is displayed as the title. Furthermore, "children" are the first item IM1 through the fourth item IM4.

In S52, the system program, etc., determines whether the type of the element (object) of "children" is "STRUCTURE" or "ITEM". Then, in a case where the type is "STRUCTURE" ("STRUCTURE" in S52), the system program, etc., proceeds the processing to S53. On the other hand, in a case where the type is "ITEM" ("ITEM" in S52), the system program, etc., proceeds the processing to S54.

In S53, the system program, etc., performs rendering according to the rendering template in such a manner as illustrated in FIG. 15, for example.

In S54, the system program, etc., determines the type of "children". In a case where the type of "children" is "NUMERICAL VALUE TYPE" ("NUMERICAL VALUE TYPE" in S54), the system program, etc., proceeds the processing to S55. In a case where the type of "children" is "CHARACTER STRING TYPE" ("CHARACTER STRING TYPE" in S54), the system program, etc., proceeds the processing to S56. In a case where the type of "children" is "OPTION SELECTION TYPE" ("OPTION SELECTION TYPE" in S54), the system program, etc., proceeds the processing to S57. In a case where the type of "children" is "EXECUTION TYPE" ("EXECUTION TYPE" in S54), the system program, etc., proceeds the processing to S58. In a case where the type of "children" is "CLOCK TYPE" ("CLOCK TYPE" in S54), the system program, etc., proceeds the processing to S59.

Note that, regarding the types, there may be other types.

As described above, in a case where "EXECUTION TYPE" is selected as the type of control information, if it is possible to recognize the control information being "EXECUTION TYPE", the system program can recognize the source code, etc., for implementing the execution I/F, the cancellation UP, or the like, so as to additionally display a GUI for execution or cancellation, etc., on the setting screen. That is, if it is possible to set the type of control information, the addition unit can be implemented.

In each of S55 through S59, the system program, etc., performs rendering as described below, for example, so as to display a setting screen.

Figure 30A:
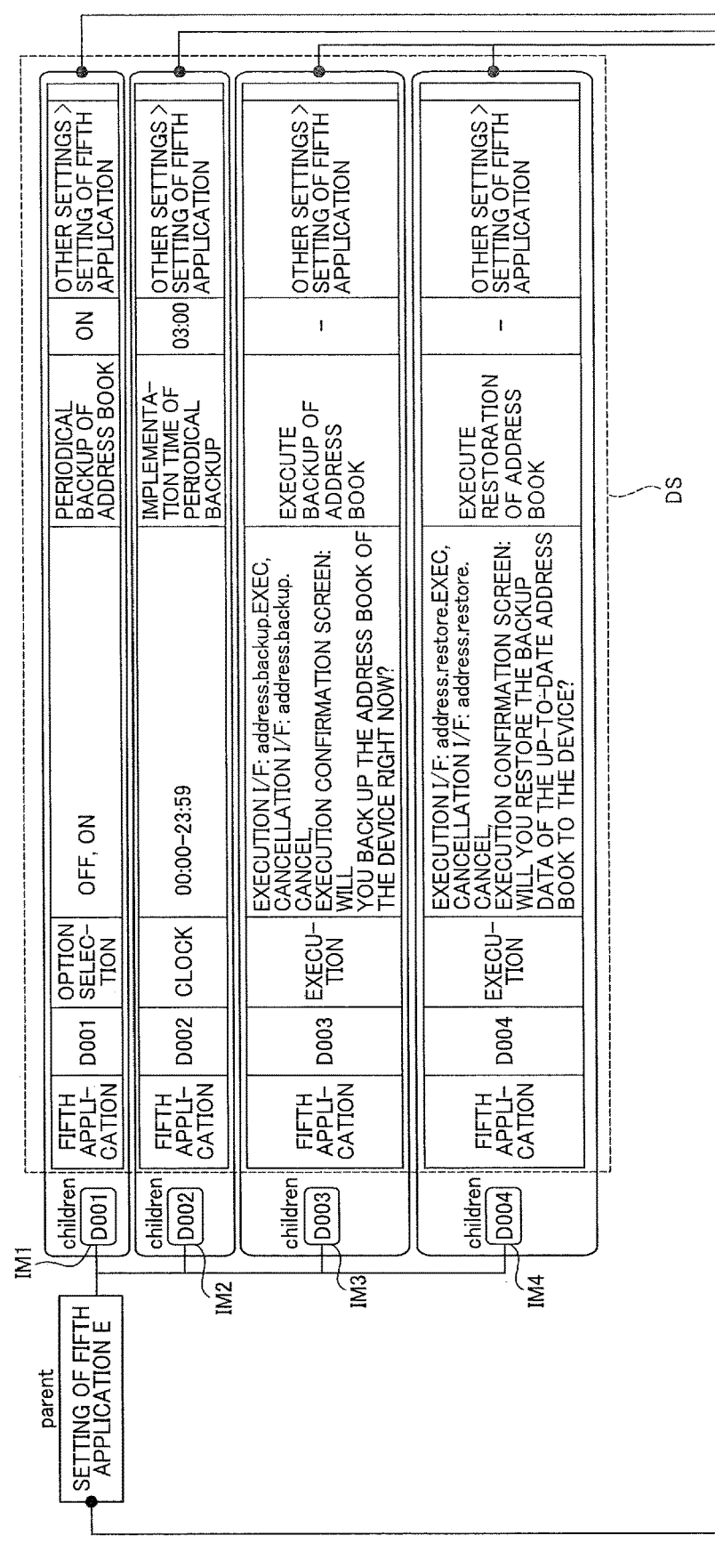
FIGS. 30A and 30B (FIG. 30) are a diagram illustrating an example of display processing.
Figure 30B:
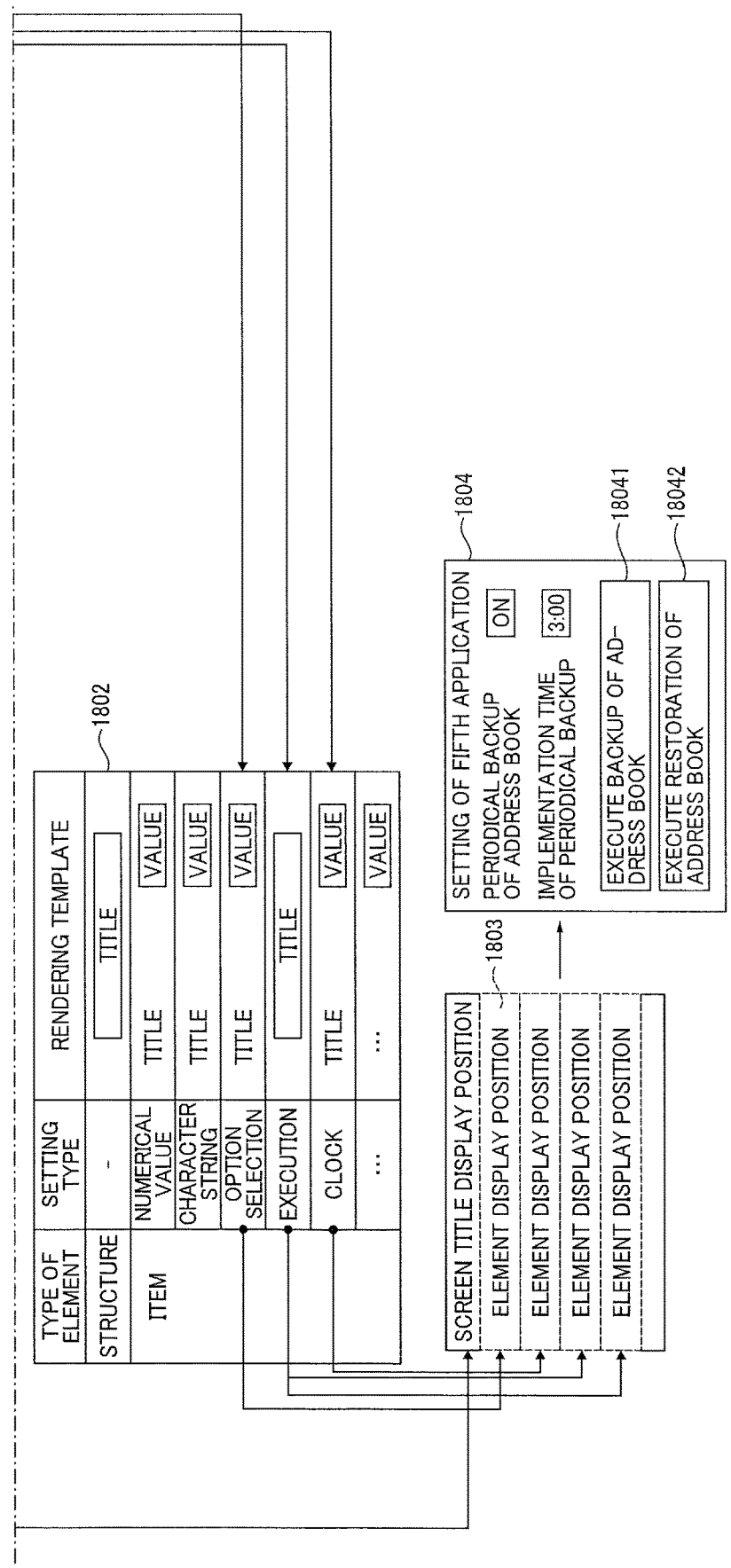

FIG. 30 is a diagram illustrating an example of display processing. For example, in order to display the setting screen 1804 as illustrated in FIG. 22, such settings as illustrated in FIG. 30 are stored in a setting value storage unit DS, which is an example of the storage unit. In this way, it is possible to display the setting screen 1804 by use of the screen template 1803 and the rendering template 1802, etc., through the processing illustrated in FIG. 29, etc. Specifically, control information as described below is entered to the setting value storage unit DS.

FIG. 31 is a diagram illustrating an example of the storage unit. For example, in order to display the cancellation operation button 18043 and the execution operation button 1044, etc., on the setting screen 1804, such control information as described below, etc., is entered in the setting value storage unit DS.

The line with "ID" being "D001" is the storage for entering the control information regarding the first item IM1.

The line with "ID" being "D002" is the storage for entering the control information regarding the second item IM2.

The line with "ID" being "D003" is the storage for entering the control information regarding the third item IM3.

The line with "ID" being "D004" is the storage for entering the control information regarding the fourth item IM4.

Hereinafter, an explanation is given with an example of the control information of the third item IM3 and the fourth item IM4, which are related to execution and cancellation of the additional application.

First, as illustrated as the first setting type entry E1 and the second setting type entry E2, in a case where "EXECUTION" is input as "SETTING TYPE", the type of the control information is recognized as "EXECUTION TYPE". That is, the type of item is determined as "EXECUTION TYPE" in S54.

Furthermore, in a case where the first execution I/F information C11 and the second execution I/F information C21 are entered in "RANGE OF ENTRY", it is possible to display the execution operation button on the setting screen.

Similarly, in a case where the first cancellation I/F information C12 and the second cancellation I/F information C22 are entered in "RANGE OF ENTRY", it is possible to display the cancellation operation button on the setting screen.

For example, control information such as the first execution I/F information C11, the second execution I/F information C21, the first cancellation I/F information C12, and the second cancellation I/F information C22 is implemented in JavaScript (registered trademark) Object Notation (JSON) format, etc.

FIG. 32 is a diagram illustrating an example of entries in JSON format. For example, display of the setting screen is implemented by control information such as a source code in JSON format as illustrated in FIG. 32. Specifically, the setting screen of "SETTING OF FIFTH APPLICATION" is implemented by such a code C5 for the fifth application.

Furthermore, for example, in order to store such setting values as illustrated in FIG. 31, the setting values are entered in JSON format as described below.

FIG. 33 is a diagram illustrating an example of entries to the storage unit in JSON format. For example, in a case where the 51st code C51 is entered, it is possible to display such a setting screen on which operations for executing and cancelling the processing for performing "backup of an address book" can be received, as illustrated in FIG. 23.

Similarly, in a case where the 51st code C52 is entered, it is possible to display a setting screen on which operations for executing and cancelling processing for performing "restoration of an address book" can be received.

Second Embodiment

In the explanation of the second embodiment, the sixth application is taken as an example of the additional application. In the following explanation, the same configuration and processing as those in the first embodiment are omitted.

FIG. 34 is a diagram illustrating an example of the storage unit. Hereinafter, an explanation is given with an example of the case in which the additional application performs processing for "SAVE DEVICE INFORMATION IN EXTERNAL DEVICE". For example, the external device is a flash memory, or the like.

In the present example, control information for receiving an operation for executing the additional application is entered in the line with "ID" being "E003".

First, as indicated by the third setting type entry E3, in a case where "EXECUTION" is input as "SETTING TYPE", the type of the control information is recognized as "EXECUTION TYPE". That is, the type of item is determined as "EXECUTION TYPE" in S54.

Furthermore, in a case where the third execution I/F information C31 is entered in "RANGE OF ENTRY", it is possible to display the execution operation button on the setting screen.

Compared to the first embodiment, the difference is that there is not a cancellation I/F in the second embodiment.

With such control information, a setting screen as described below is displayed during execution, for example.

Figure 35:
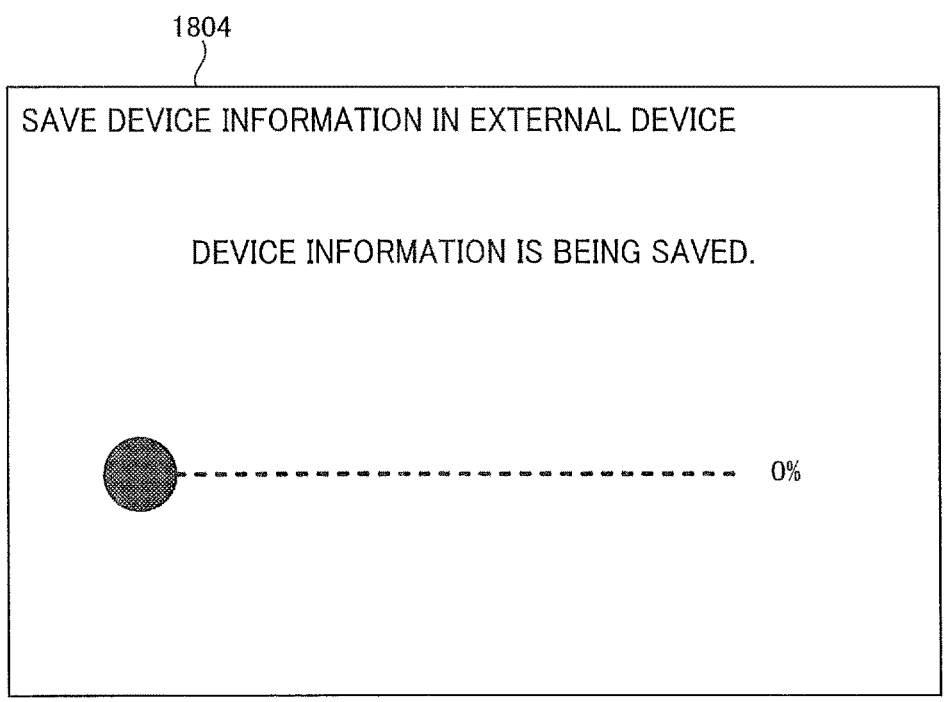
FIG. 35 is a diagram illustrating an example of a setting screen during execution.
Figure 36:
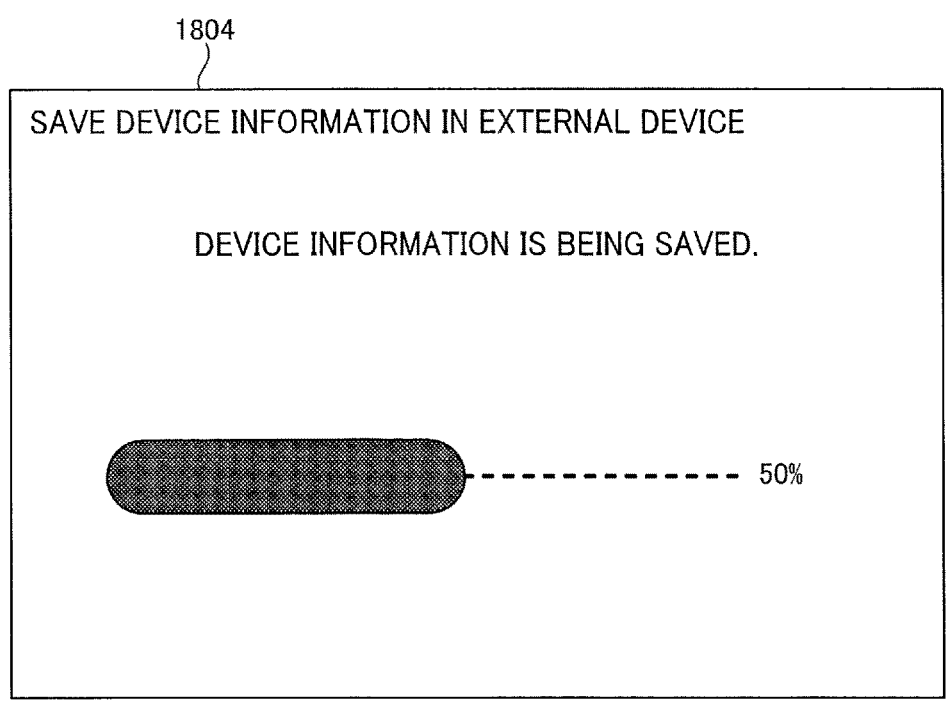
FIG. 36 is a diagram illustrating an example of a setting screen during execution.

FIGS. 35 and 36 are diagrams illustrating examples of the setting screen during execution. Compared to the first embodiment, the difference is that there is not a cancellation operation button 18043 on the setting screen 1804.

In other words, in a case of such a setting screen as illustrated in FIGS. 35 and 36, it is possible to prevent an operation for cancellation from being performed during execution.

Figure 37:
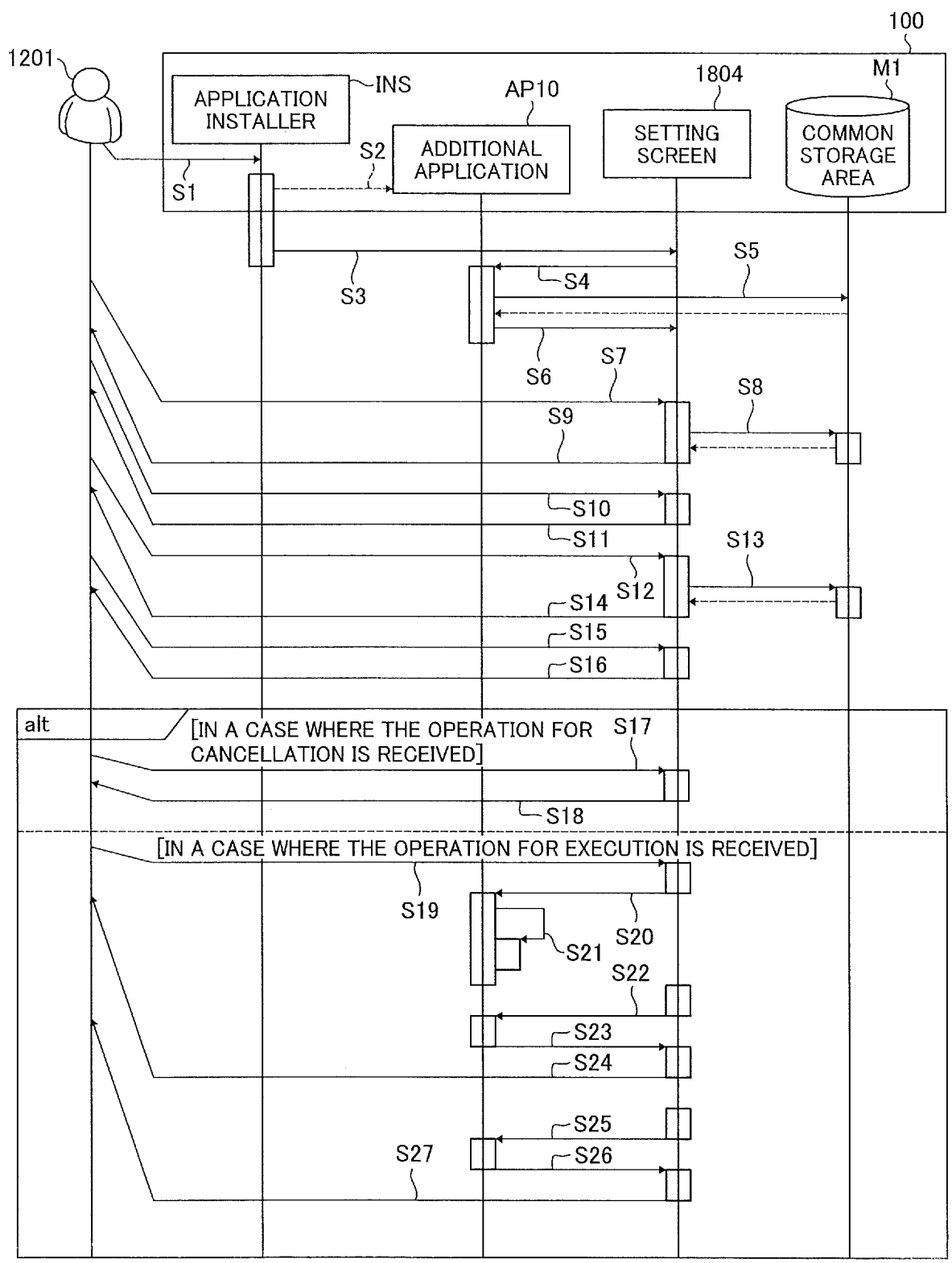
FIG. 37 is a sequence diagram illustrating an example of the overall processing.

FIG. 37 is a sequence diagram illustrating an example of the overall processing. Compared to the first embodiment, the difference is that, in the entire processing of the second embodiment, there is not a case in which processing of S28 to S36 is executed.

As described above, it is also possible that control information includes execution I/F information for executing an application and does not include cancellation I/F information for cancelling execution of the application. In this way, it is possible to disable the user operation for cancelling execution of the application during execution.

Third Embodiment

In the explanation of the third embodiment, the seventh application is taken as an example of the additional application. In the following explanation, the same configuration and processing as those in the first embodiment are omitted.

FIG. 38 is a diagram illustrating an example of the storage unit. Hereinafter, an explanation is given with an example of the case in which the additional application performs the processing of "PLAY AUDIO NARRATION SAMPLE".

In the present example, control information for receiving an operation for executing the additional application is entered in the line with "ID" being "F003".

First, as indicated by the fourth setting type entry E4, in a case where "EXECUTION" is input as "SETTING TYPE", the type of the control information is recognized as "EXECUTION TYPE". That is, the type of item is determined as "EXECUTION TYPE" in S54.

Furthermore, in a case where the fourth execution I/F information C41 is entered in "RANGE OF ENTRY", it is possible to display the execution operation button on the setting screen.

Compared to the second embodiment, the type of execution I/F is different in the third embodiment.

Furthermore, for example, in order to store such setting values as illustrated in FIG. 38, the setting values are entered in JSON format as described below.

FIG. 39 is a diagram illustrating an example of entries to the storage unit in JSON format. For example, in a case where the seventh code C7 is entered, the processing can be executed without displaying such screens as illustrated in FIGS. 23 to 27. That is, it is also possible that the execution I/F is implemented by a source code such as the seventh code C7. Specifically, the setting screen 1804 transitions as described below.

Figure 40:
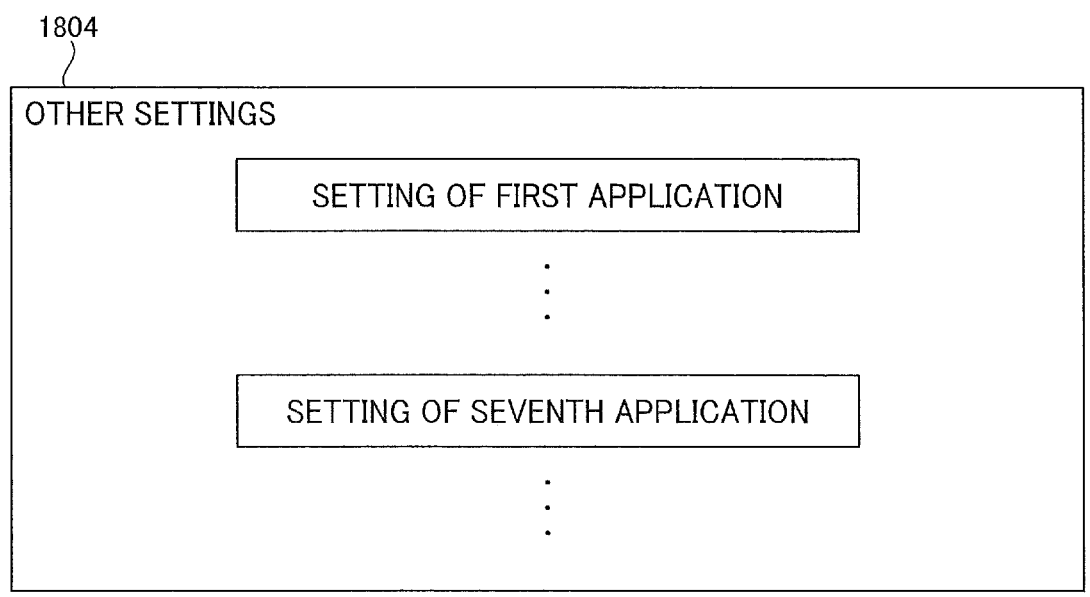
FIG. 40 is a diagram illustrating an example of transition of setting screens.

FIG. 40 is a diagram illustrating an example of transition of setting screens. Compared to the first embodiment, the difference is that the setting screen 1804 is made to transition to a setting screen for changing a setting value in response to an operation of pressing the "SETTING OF SEVENTH APPLICATION" button. Since the present embodiment is the same as the first embodiment in terms of the operations in FIG. 20, etc., the explanations thereof are omitted.

For example, in a case where the "SETTING OF SEVENTH APPLICATION" button is pressed, the setting screen 1804 transitions as described below.

Figure 41:
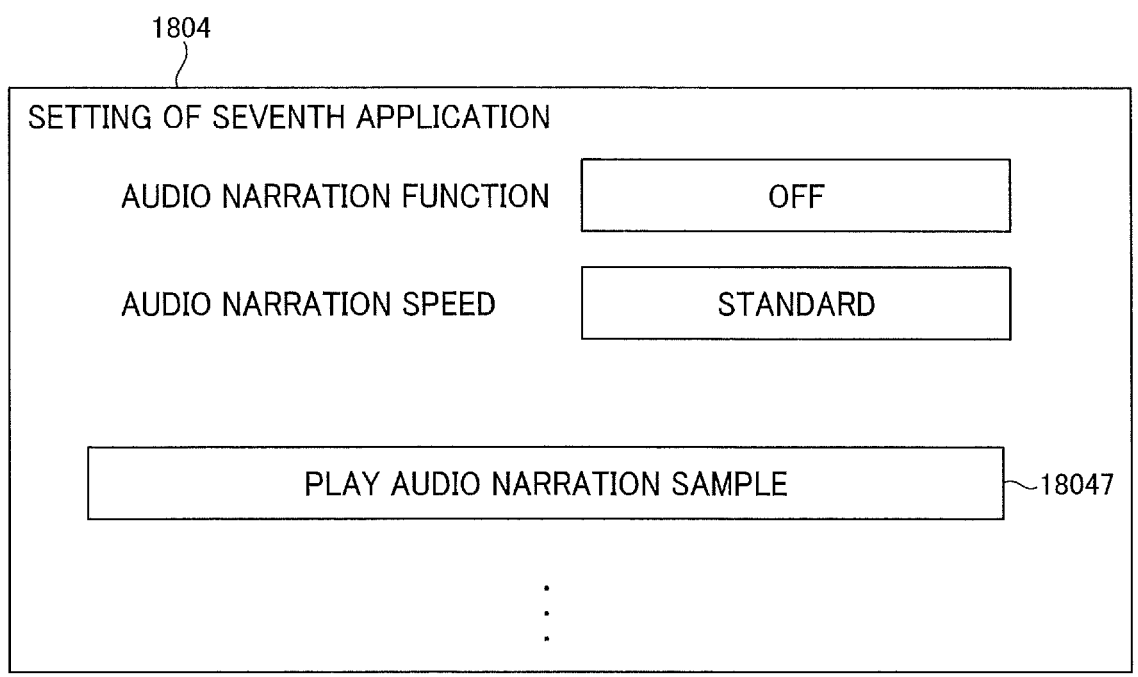
FIG. 41 is a diagram illustrating an example of transition of setting screens.

FIG. 41 is a diagram illustrating an example of transition of setting screens. The present example is an example in which a "PLAY AUDIO NARRATION SAMPLE" button (hereinafter referred to as the "processing execution button 18047") is displayed because of the item "F003" in FIGS. 38 and 39.

The "AUDIO NARRATION FUNCTION" is displayed because of the item "F001" in FIG. 38 and FIG. 39. Furthermore, "AUDIO NARRATION SPEED" is displayed because of the item "F002" in FIG. 38 and FIG. 39.

In the third embodiment, in a case where the processing execution button 18047 is pressed, the processing is executed while the setting screen 1804 illustrated in FIG. 41 is maintained. In the present example, based on an audio file entered in advance, the processing for playing the audio is executed by the seventh application.

That is, in the third embodiment, unlike the first embodiment, the setting screen is not made to transition even in a case where processing is executed by an application.

Accordingly, it is possible to omit such a screen for receiving operations for execution and cancellation and such a screen for displaying the degree of progress, etc., as illustrated in FIGS. 23 through 27. Therefore, the processing can be executed more quickly.

Additionally, for example, the entire processing is performed as described below.

Figure 42:
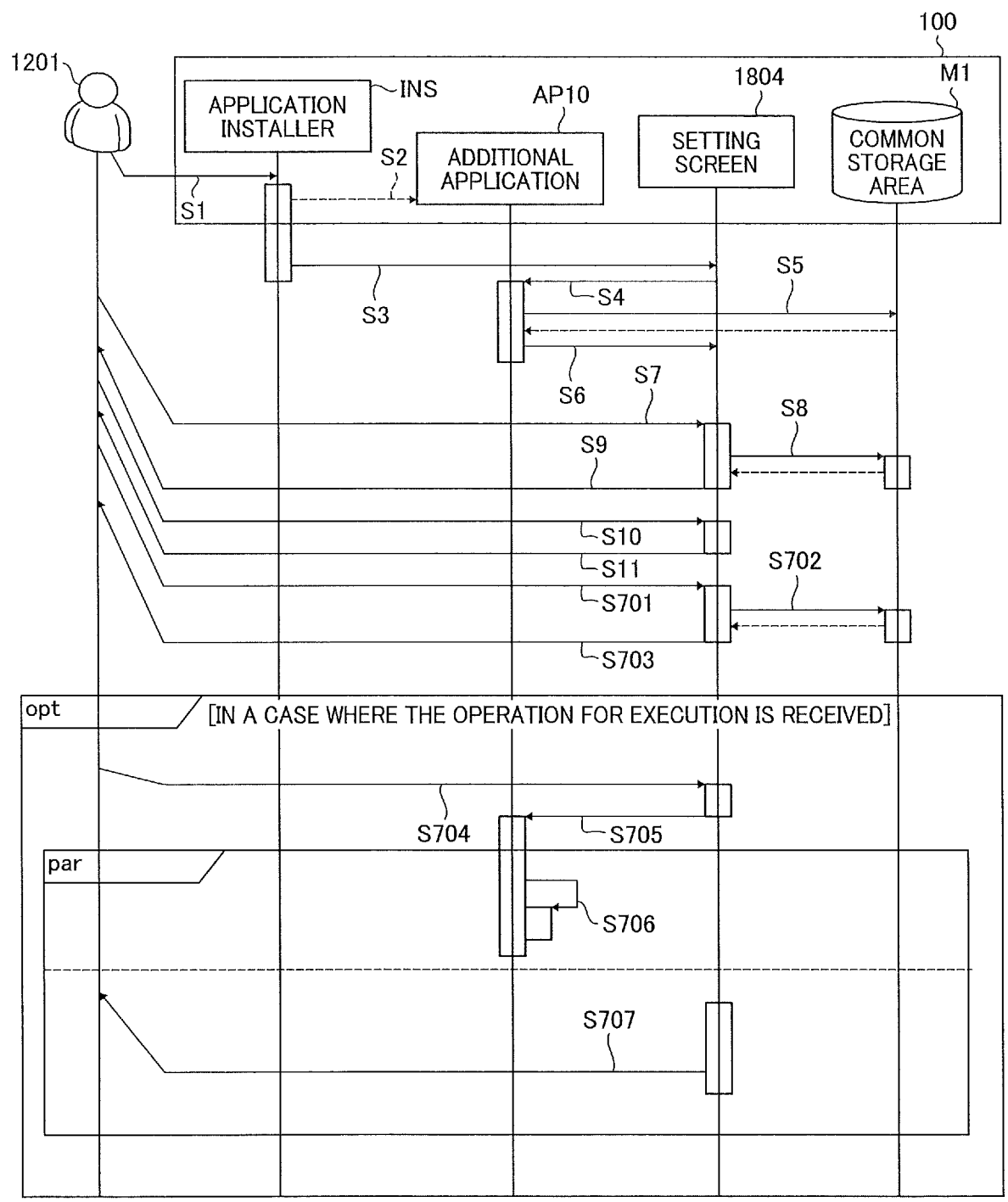
FIG. 42 is a sequence diagram illustrating an example of the overall processing.

FIG. 42 is a sequence diagram illustrating an example of the overall processing. Compared to the first embodiment and the second embodiment, the difference is that the processes performed after S11 are replaced with S701 through S707 in the third embodiment. Hereinafter, an explanation is given mainly of the difference.

First, in the third embodiment, such a setting screen 1804 as illustrated in FIG. 40 is displayed in S11.

In S701, the setting screen 1804 receives the operation of pressing the "SETTING OF SEVENTH APPLICATION" button.

In S702, the setting screen 1804 retrieves setting values, etc.

In S703, for example, the setting screen 1804 transitions to such a screen as illustrated in FIG. 41.

For example, in a case where the processing execution button 18047 is pressed ([IN A CASE WHERE THE OPERATION FOR EXECUTION IS RECEIVED]), the image forming apparatus proceeds the processing to S704.

In S704, the setting screen 1804 receives the operation of pressing the processing execution button 18047. In a case where such an operation is received, S706 and S707 are parallelly executed.

In S705, the setting screen 1804 calls the additional application AP10 by use of the execution I/F.

In S706, the additional application AP10 executes predetermined processing. In the present example, the additional application AP10 performs processing for playing a sample audio.

In S707, display of the setting screen 1804 is maintained in parallel with the execution of S706. That is, the setting screen 1804 is maintained to be displayed as illustrated in FIG. 41, for example.

With such overall processing as described above, it is possible to reduce transition of setting screens. As described above, there may be a case in which it is preferable that a setting screen is maintained, depending on the type of processing executed by the application. In addition, implementation with such an execution I/F is preferable since there may also be a case in which it is preferable to omit displaying of a GUI, or the like, for receiving execution. Furthermore, an operation for cancellation can be omitted.

Modification Examples

The types of applications and the types of processing to be executed are not limited to the above-described examples. That is, as for processing executed by an application, various processing, which are determined by applications installed in advance, may be applied.

Note that the interface for receiving operations may be a GUI other than a button, for example. The image forming apparatus may have a configuration including an operation unit. That is, the image forming apparatus may have a configuration including an operation unit implemented by an input device and an output device, etc., other than the operation device. Furthermore, setting values may be received in an operation procedure through the operation unit.

Moreover, it is preferable that setting values are extracted based on authority given to the user (including a group, etc.). In many cases, the user can only set setting values for which the user has authority. Therefore, it is preferable that, among all the setting values, the setting values for which the user is authorized to set, change, view, or the like, are extracted. In a case where setting values for which the user does not have authority are omitted in this way, it is possible to reduce unnecessary processing, display, or the like.

Similarly, it is preferable that setting values are extracted based on the presence or absence of peripheral devices. Some setting values are unnecessary depending on whether a peripheral device is connected or not. Therefore, it is preferable that, among all the setting values, the setting values used for operating the peripheral device are extracted. Note that it is even more preferable that the type of the peripheral device is considered for the extraction. In a case where setting values that are not related to usage of peripheral devices are omitted in this way, it is possible to reduce unnecessary processing, display, or the like.

Furthermore, regarding operations for a setting value, it is preferable that an operation through the operation unit or the operation device, or setting through the setting unit, is prioritized by the external lock, or the like. In many cases, for setting by use of the operation device, etc., the user comes close to the image forming apparatus for the operation. Therefore, it is unlikely that the person who performs the operation attempts to perform an improper operation by use of a network. In other words, it is likely that the person who performs the operation attempts to immediately use the image forming apparatus with the setting values that have been set. Therefore, in a case where an operation through the operation device, etc., is prioritized over an operation through a browser, etc., the convenience for the user can be improved.

Note that all or a part of the respective processes according to the present invention may be described in a low-level programing language or a high-level programing language and may be implemented by a program for causing a computer to execute an information processing method.

That is, such a program is a computer program that causes a computer, such as an image forming apparatus, an information processing apparatus, or an image forming system including multiple information processing apparatuses, to execute the respective processes.

Therefore, in a case where the information processing method is executed based on such a program, an arithmetic device and a control device included in the computer execute the respective processes, so that operation and control are performed based on the program. Furthermore, the storage device included in the computer stores data to be used for processing based on the program, so that the respective processes are executed.

In addition, the program can be recorded in a computer-readable recording medium for the purpose of distribution. Note that the recording medium includes media such as a magnetic tape, a flash memory, an optical disc, a magneto-optical disc, and magnetic disc. Furthermore, the program can be distributed via telecommunication lines.

Note that the embodiments according to the present invention may be implemented by an image forming system. Furthermore, the image forming system may execute the respective processes redundantly, separately, parallelly, virtually, or by combination of such manners.

Although the examples of the embodiments are explained above, the present invention is not limited to the above-described embodiments. That is, various modifications and improvements are possible within the scope of the present invention.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus comprising:
a memory configured to store control information to be utilized for displaying a setting screen, the setting screen being associated with execution of an application; and
circuitry electrically coupled to the memory, the circuitry being configured to:
receive an installation request to install the application from a user;
add the application to the memory, in response to receiving the installation request;

detect that the application is added to the memory;
store, in the memory, control information, for performing installation of the added application, to be applied to the added application, in response to detecting that the application is added to the memory;
display, in response to storing the control information, the setting screen for receiving a user operation that enables the user to allow or deny execution of the added application on the information processing apparatus prior to completing the installation of the added application, the setting screen being based on the stored control information to be applied to the added application;
detect a user operation indicating that the installation of the added application is allowed to be performed, via the displayed setting screen; and
execute, in response to detecting the user operation, the added application on the information processing apparatus based on the stored control information applied to the added application, to complete the installation of the added application.

2. The information processing apparatus of claim 1, wherein the setting screen includes a graphical image for detecting the user operation relating to the execution of the added application.

3. The information processing apparatus of claim 1, wherein the user operation includes an operation to execute the added application.

4. The information processing apparatus of claim 3, wherein the circuitry is configured to execute the added application while displaying the setting screen.

5. The information processing apparatus of claim 1, wherein the user operation includes an operation to cancel the execution of the added application.

6. The information processing apparatus of claim 1, wherein the circuitry is configured to store, in the memory, information relating to the execution of the added application and information relating to a setting value of the added application.

7. The information processing apparatus of claim 1, wherein the circuitry is configured to display progress of the execution of the added application on the setting screen.

8. The information processing apparatus of claim 1, wherein the information processing apparatus further comprises:
second circuitry configured to form an image; and
third circuitry configured to receive the user operation.

9. An information processing method executed by an information processing apparatus, the information processing method comprising:
receiving an installation request to install an application from a user;
adding the application to a memory, in response to receiving the installation request;
detecting that the application is added to the memory;
storing control information, for performing installation of the added application, to be applied to the added application, in response to detecting that the application is added to the memory;
displaying, in response to storing the control information, a setting screen for receiving a user operation that enables the user to allow or deny execution of the added application on the information processing apparatus prior to completing the installation of the added application, the setting screen being displayed based on the stored control information to be applied to the added application;
detecting a user operation indicating that the installation of the added application is allowed to be performed, via the displayed setting screen; and
executing, in response to detecting the user operation, the added application on the information processing apparatus based on the stored control information applied to the added application, to complete the installation of the added application.

10. The information processing method of claim 9, wherein in the displaying of the setting screen, the setting screen includes a graphical image for detecting the user operation relating to the execution of the added application.

11. The information processing method of claim 9, wherein the user operation includes an operation to execute the added application.

12. The information processing method of claim 11, wherein the executing of the added application includes executing the added application while displaying the setting screen.

13. The information processing method of claim 9, wherein the user operation includes an operation to cancel the execution of the added application.

14. The information processing method of claim 9, further comprising: storing information relating to the execution of the added application and information relating to a setting value of the added application.

15. The information processing method of claim 9, further comprising: displaying progress of the execution of the added application on the setting screen.

16. A non-transitory recording medium storing a plurality of instructions which, when executed by one or more processors of an information processing apparatus, cause the processors to perform a method, the method comprising:
receiving an installation request to install an application from a user;
adding the application to a memory, in response to receiving the installation request,
detecting that the application is added to the memory;
storing control information, for performing installation of the added application, to be applied to the added application, in response to detecting that the application is added to the memory;
displaying, in response to storing the control information, a setting screen for receiving a user operation that enables the user to allow or deny execution of the added application on the information processing apparatus prior to completing the installation of the added application, the setting screen being displayed based on the stored control information to be applied to the added application;
detecting a user operation indicating that the installation of the added application is allowed to be performed, via the displayed setting screen; and
executing, in response to detecting the user operation, the added application on the information processing apparatus based on the stored control information applied to the added application, to complete the installation of the added application.

17. The recording medium of claim 16, wherein in the displaying of the setting screen, the setting screen includes a graphical image for detecting the user operation relating to the execution of the added application.

18. The recording medium of claim 16, wherein the executing of the added application includes executing the added application while displaying the setting screen.

19. The recording medium of claim 16, wherein the method further comprises storing information relating to the execution of the added application and information relating to a setting value of the added application.

20. The recording medium of claim 16, wherein the method further comprises displaying progress of the execution of the added application on the setting screen.

* * * * *